US012138927B2

(12) United States Patent
Nakayama

(10) Patent No.: US 12,138,927 B2
(45) Date of Patent: Nov. 12, 2024

(54) HEAD CHIP, LIQUID JET HEAD, AND LIQUID JET RECORDING DEVICE

(71) Applicant: SII Printek Inc., Chiba (JP)

(72) Inventor: Hitoshi Nakayama, Chiba (JP)

(73) Assignee: SII PRINTEK INC., Chiba (JP)

( * ) Notice: Subject to any disclaimer, the term of this patent is extended or adjusted under 35 U.S.C. 154(b) by 108 days.

(21) Appl. No.: 18/080,489

(22) Filed: Dec. 13, 2022

(65) Prior Publication Data

US 2023/0191782 A1 Jun. 22, 2023

(30) Foreign Application Priority Data

Dec. 20, 2021 (JP) ................................ 2021-206364

(51) Int. Cl.
*B41J 2/14* (2006.01)

(52) U.S. Cl.
CPC ....... *B41J 2/14201* (2013.01); *B41J 2/14209* (2013.01); *B41J 2/14233* (2013.01); *B41J 2002/14225* (2013.01); *B41J 2002/14241* (2013.01)

(58) Field of Classification Search
CPC ................ B41J 2/14201; B41J 2/14209; B41J 2/14233; B41J 2002/14225; B41J 2002/14241
See application file for complete search history.

(56) References Cited

U.S. PATENT DOCUMENTS 4,584,590 A 4/1986 Fischbeck et al.
5,639,508 A * 6/1997 Okawa .................. B41J 2/1612 29/25.35
2002/0140786 A1 10/2002 Sugahara
2015/0202873 A1 7/2015 Suzuki

FOREIGN PATENT DOCUMENTS

EP 1336495 A1 8/2003
EP 2428362 A1 3/2012
JP H09-323410 A 12/1997
WO WO 2006/037995 A2 4/2006

OTHER PUBLICATIONS

Extended European Search Report in Europe Application No. 222148975, dated May 11, 2023, 8 pages.

* cited by examiner

*Primary Examiner* — Geoffrey S Mruk
(74) *Attorney, Agent, or Firm* — Crowell & Moring LLP

(57) ABSTRACT

A head chip, a liquid jet head, and a liquid jet recording device each capable of inhibiting mechanical crosstalk, and exerting a desired jet performance are provided. The head chip according to an aspect of the present disclosure includes a flow channel member having a plurality of pressure chambers containing liquid, an actuator plate which is stacked on the flow channel member in a state of being opposed in a first direction to the pressure chambers, and a drive electrode which is formed on a surface of the actuator plate, the surface facing to the first direction, and which is configured to deform the actuator plate in the first direction to change a volume of at least one of the pressure chambers. A dividing groove which is configured to zone the actuator plate between the pressure chambers adjacent to each other is formed in a portion of the actuator plate, the portion being located between the pressure chambers adjacent to each other when viewed from the first direction.

8 Claims, 31 Drawing Sheets

HEAD CHIP, LIQUID JET HEAD, AND LIQUID JET RECORDING DEVICE

RELATED APPLICATIONS

This application claims priority to Japanese Patent Application No. 2021-206364, filed on Dec. 20, 2021, the entire content of which is incorporated herein by reference.

BACKGROUND OF THE INVENTION

1. Field of the Invention

The present disclosure relates to a head chip, a liquid jet head, and a liquid jet recording device.

2. Description of the Related Art

A head chip to be mounted on an inkjet printer ejects ink contained in a pressure chamber through a nozzle hole to thereby record print information such as a character or an image on a recording target medium. In the head chip, in order to make the head chip eject the ink, first, an electric field is generated in an actuator plate formed of a piezoelectric material to thereby deform the actuator plate. In the head chip, by changing a volume in the pressure chamber due to the deformation of the actuator plate to increase the pressure in the pressure chamber, the ink is ejected through the nozzle hole.

Here, as a deformation mode of the actuator plate, there is cited a so-called shear mode in which a shear deformation (a thickness-shear deformation) is caused in the actuator plate due to the electric field to be generated in the actuator plate.

The head chip of a so-called roof-shoot type out of the types of the shear mode has a configuration in which the actuator plate is arranged so as to be opposed to the pressure chambers provided to a flow channel member (see, e.g., the specification of U.S. Pat. No. 4,584,590). In the roof-shoot type head chip, by the actuator plate deforming in the thickness direction, the volume of the pressure chamber varies.

However, in the head chip, since the plurality of pressure chambers is arranged side by side, there is a possibility that a deformation of a portion of the actuator plate corresponding to one of the pressure chambers affects a portion corresponding to another of the pressure chambers adjacent to the one of the pressure chambers (so-called mechanical crosstalk). When the portion of the actuator plate corresponding to the another of the pressure chambers exhibits an unexpected behavior due to the mechanical crosstalk, there is a possibility that a desired ejection performance cannot be exerted.

SUMMARY OF THE INVENTION

The present disclosure provides a head chip, a liquid jet head, and a liquid jet recording device each capable of inhibiting the mechanical crosstalk.

In view of the problems described above, the present disclosure adopts the following aspects.

(1) A head chip according to an aspect of the present disclosure includes a flow channel member having a plurality of pressure chambers containing liquid, an actuator plate which is stacked on the flow channel member in a state of being opposed in a first direction to the pressure chambers, and a drive electrode which is formed on a surface of the actuator plate, the surface facing to the first direction, and which is configured to deform the actuator plate in the first direction to change a volume of at least one of the pressure chambers, wherein a dividing groove which is configured to zone the actuator plate between the pressure chambers adjacent to each other is formed in a portion of the actuator plate, the portion being located between the pressure chambers adjacent to each other when viewed from the first direction.

According to the present aspect, since the dividing groove is disposed in the portion of the actuator plate located between the pressure chambers adjacent to each other, it is possible to inhibit a phenomenon (so-called mechanical crosstalk) that a deformation of a portion of the actuator plate corresponding to one of the pressure chambers adjacent to each other propagates to a portion corresponding to the other of the pressure chambers. As a result, it is possible to prevent the deterioration of the jet performance due to the occurrence of the mechanical crosstalk.

(2) In the head chip according to the aspect (1) described above, the pressure chambers can include opening parts which open toward the actuator plate in the first direction, the drive electrode can be disposed on a first surface of the actuator plate, the first surface being opposed to the flow channel member in the first direction, the dividing groove can open on at least the first surface, an insulating sheet can be attached on the first surface so as to cover the drive electrode and the dividing groove, and the actuator plate can be disposed on the flow channel member via the insulating sheet so as to close the opening parts.

According to the present aspect, since it is possible to inhibit the drive electrode from making contact with the liquid due to the insulating sheet, it is possible to inhibit short circuit, corrosion, and so on of the drive electrode. Further, since the insulating sheet is disposed so as to cover the dividing groove, bubbles which are confined between the insulating sheet and the actuator plate when attaching the insulating sheet to the actuator plate can be discharged to the inside of the dividing groove. Thus, it is possible to improve the adhesiveness between the actuator plate and the insulating sheet. As a result, the ink is inhibited from entering an area between the actuator plate and the insulating sheet, and thus, it becomes easy to inhibit the short circuit, the corrosion, and so on of the drive electrode.

(3) In the head chip according to the aspect (2) described above, the actuator plate can be provided with a through hole penetrating the actuator plate in the first direction, and a through interconnection which is configured to pattern the drive electrode toward a second surface of the actuator plate can be formed in the through hole, the second surface facing to an opposite side to the first surface in the first direction.

According to the present aspect, by patterning the drive electrode toward the second surface via the through interconnection, it becomes easy to ensure the mounting area of the external wiring. Thus, it is possible to increase a degree of design freedom.

(4) In the head chip according to the aspect (3) described above, the through hole can be formed integrally with the dividing groove in the portion of the actuator plate, the portion being located between the pressure chambers adjacent to each other when viewed from the first direction.

According to the present aspect, by forming the dividing groove and the through hole integrally with each other, it is possible to achieve the reduction in size of the head chip compared to when forming the dividing groove and the through hole separately from each other.

(5) In the head chip according to the aspect (3) described above, the through hole can be disposed separately from the dividing groove.

According to the present aspect, by disposing the through hole and the dividing groove separately from each other, it is possible to achieve an increase in degree of design freedom such as providing the through hole and the dividing groove with shapes suitable for the respective functions.

(6) In the head chip according to the aspect (5) described above, defining an arrangement direction of the plurality of pressure chambers when viewed from the first direction as a second direction, the through hole can be disposed in the actuator plate at an outer side of the pressure chambers in a third direction crossing the second direction when viewed from the first direction.

According to the present aspect, since it is sufficient for the dividing groove to ensure the width with which the mechanical crosstalk can be inhibited, by disposing the through hole at the outer side in the third direction with respect to the pressure chambers, it is possible to reduce the distance between the pressure chambers adjacent in the second direction to each other. As a result, it is possible to achieve the reduction in size in the second direction of the head chip. Further, when curving out the head chip from a single wafer, it is possible to increase the number of the head chips taken per wafer. As a result, it is possible to achieve the cost reduction.

(7) In the head chip according to the aspect (6) described above, the through hole can extend in the second direction so as to straddle the plurality of pressure chambers.

According to the present aspect, by commonalizing the through hole to the plurality of pressure chambers, it is possible to achieve simplification of the configuration.

(8) In the head chip according to one of the aspects (6) and (7) described above, the through hole can be disposed for each of the pressure chambers in a portion located at the outer side of the pressure chambers in the third direction.

According to the present aspect, since the through hole is disposed for each of the pressure chambers, it is possible to form the through interconnection corresponding to the single pressure chamber in each of the through holes. Thus, the patterning of the interconnections becomes easy, and it is possible to achieve the increase in manufacturing efficiency.

(9) A liquid jet head according to an aspect of the present disclosure includes the head chip according to any one of the aspects (1) through (8) described above.

According to the present aspect, it is possible to provide a liquid jet head high in quality.

(10) A liquid jet recording device according to an aspect of the present disclosure includes the liquid jet head according to the aspect (9) described above.

According to the present aspect, it is possible to provide a liquid jet recording device high in quality.

According to an aspect of the present disclosure, it is possible to inhibit the mechanical crosstalk, and thus, it is possible to exert a desired jet performance.

DETAILED DESCRIPTION OF THE PREFERRED EMBODIMENTS

Figure 1:
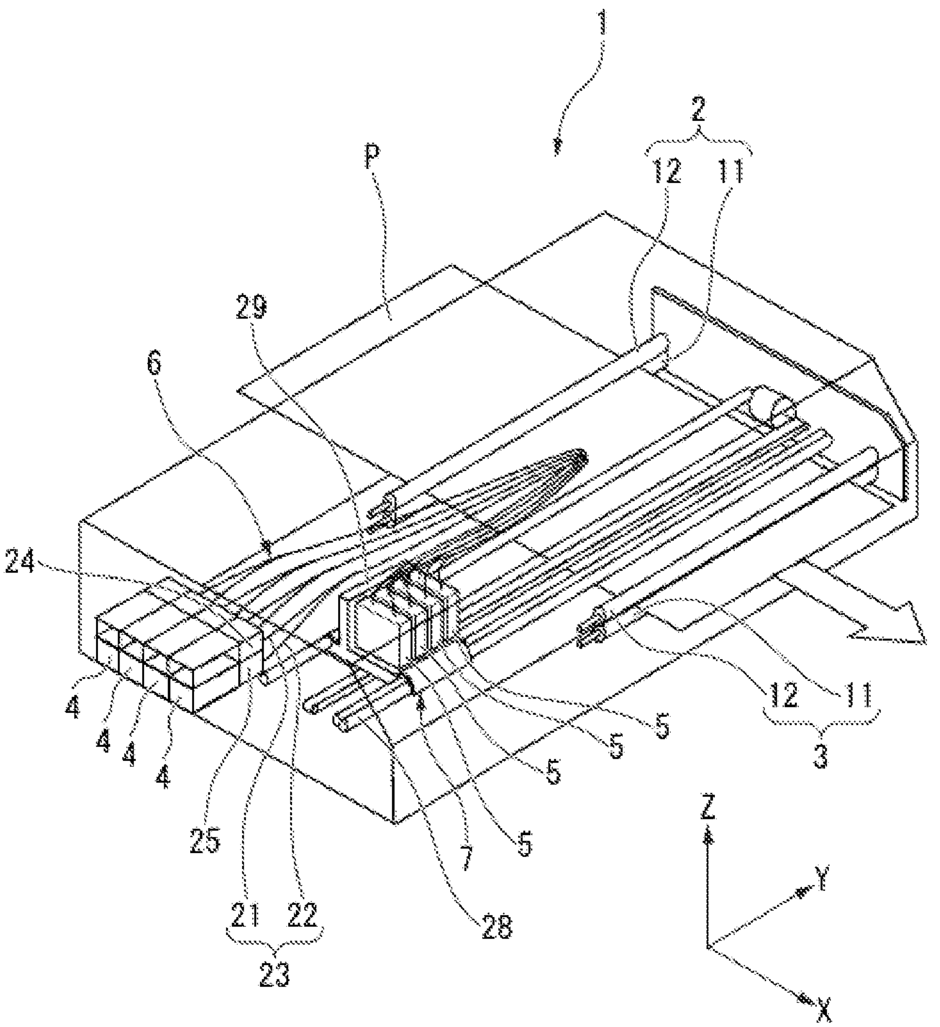
FIG. 1 is a schematic configuration diagram of an inkjet printer according to a first embodiment.

Some embodiments according to the present disclosure will hereinafter be described with reference to the drawings. In the embodiments and modified examples described hereinafter, constituents corresponding to each other are denoted by the same reference symbols, and the description thereof will be omitted in some cases. In the following description, expressions representing relative or absolute arrangement such as "parallel," "perpendicular," "center," and "coaxial" not only represent strictly such arrangements, but also represent the state of being relatively displaced with a tolerance, or an angle or a distance to the extent that the same function can be obtained. In the following embodiments, the description will be presented citing an inkjet printer (hereinafter simply referred to as a printer) for performing recording on a recording target medium using ink (liquid) as an example. The scale size of each member is arbitrarily modified so as to provide a recognizable size to the member in the drawings used in the following description.

First Embodiment

[Printer 1]

FIG. 1 is a schematic configuration diagram of a printer 1.

The printer (a liquid jet recording device) 1 shown in FIG. 1 is provided with a pair of conveying mechanisms 2, 3, ink tanks 4, inkjet heads (liquid jet heads) 5, ink circulation mechanisms 6, and a scanning mechanism 7.

In the following explanation, the description is presented using an orthogonal coordinate system of X, Y, and Z as needed. In this case, an X direction coincides with a conveying direction (a sub-scanning direction) of a recording target medium P (e.g., paper). A Y direction coincides with a scanning direction (a main scanning direction) of the scanning mechanism 7. A Z direction represents a height direction (a gravitational direction) perpendicular to the X direction and the Y direction. In the following explanation, the description will be presented defining an arrow side as a positive (+) side, and an opposite side to the arrow as a negative (−) side in the drawings in each of the X direction, the Y direction, and the Z direction. In the present specification, the +Z side corresponds to an upper side in the gravitational direction, and the −Z side corresponds to a lower side in the gravitational direction.

The conveying mechanisms 2, 3 convey the recording target medium P toward the +X side. The conveying mechanisms 2, 3 each include a pair of rollers 11, 12 extending in, for example, the Y direction.

The ink tanks 4 respectively contain four colors of ink such as yellow ink, magenta ink, cyan ink, and black ink. The inkjet heads 5 are configured so as to be able to respectively eject the four colors of ink, namely the yellow ink, the magenta ink, the cyan ink, and the black ink in accordance with the ink tanks 4 coupled thereto.

Figure 2:
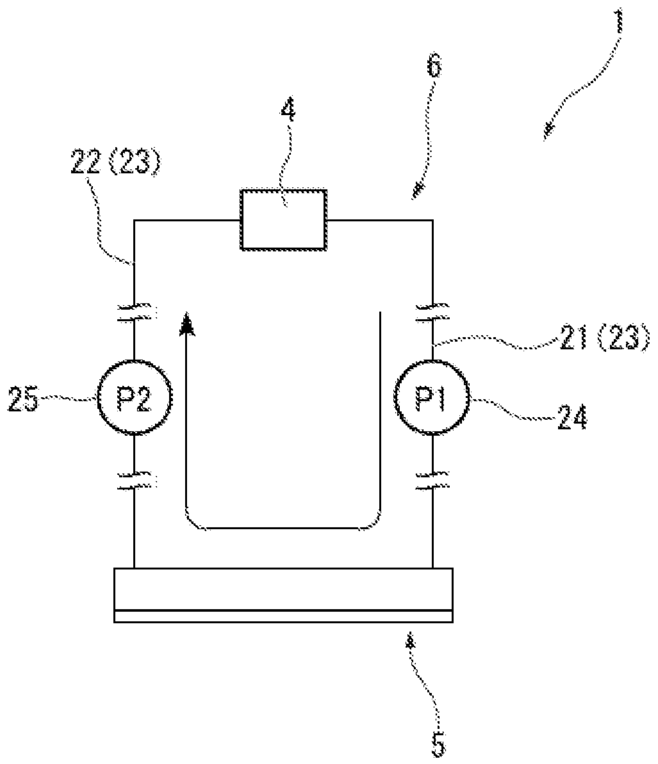
FIG. 2 is a schematic configuration diagram of an inkjet head and an ink circulation mechanism according to the first embodiment.

FIG. 2 is a schematic configuration diagram of the inkjet head 5 and the ink circulation mechanism 6.

As shown in FIG. 1 and FIG. 2, the ink circulation mechanism 6 circulates the ink between the ink tank 4 and the inkjet head 5. Specifically, the ink circulation mechanism 6 is provided with a circulation flow channel 23 having an ink supply tube 21 and an ink discharge tube 22, a pressure pump 24 coupled to the ink supply tube 21, and a suction pump 25 coupled to the ink discharge tube 22.

The pressure pump 24 pressurizes an inside of the ink supply tube 21 to deliver the ink to the inkjet head 5 through the ink supply tube 21. Thus, the ink supply tube 21 is provided with positive pressure with respect to the ink jet head 5.

The suction pump 25 depressurizes an inside of the ink discharge tube 22 to suction the ink from the inkjet head 5 through the ink discharge tube 22. Thus, the ink discharge tube 22 is provided with negative pressure with respect to the ink jet head 5. It is arranged that the ink can circulate between the inkjet head 5 and the ink tank 4 through the circulation flow channel 23 by driving the pressure pump 24 and the suction pump 25.

As shown in FIG. 1, the scanning mechanism 7 reciprocates the inkjet heads 5 in the Y direction. The scanning mechanism 7 is provided with a guide rail 28 extending in the Y direction, and a carriage 29 movably supported by the guide rail 28.

<Inkjet Heads 5>

The inkjet heads 5 are mounted on the carriage 29. In the illustrative example, the plurality of inkjet heads 5 is mounted on the single carriage 29 so as to be arranged side by side in the Y direction. The inkjet heads 5 are each provided with a head chip 50 (see FIG. 3), an ink supply section (not shown) for coupling the ink circulation mechanism 6 and the head chip 50, and a controller (not shown) for applying a drive voltage to the head chip 50.

<Head Chip 50>

Figure 3:
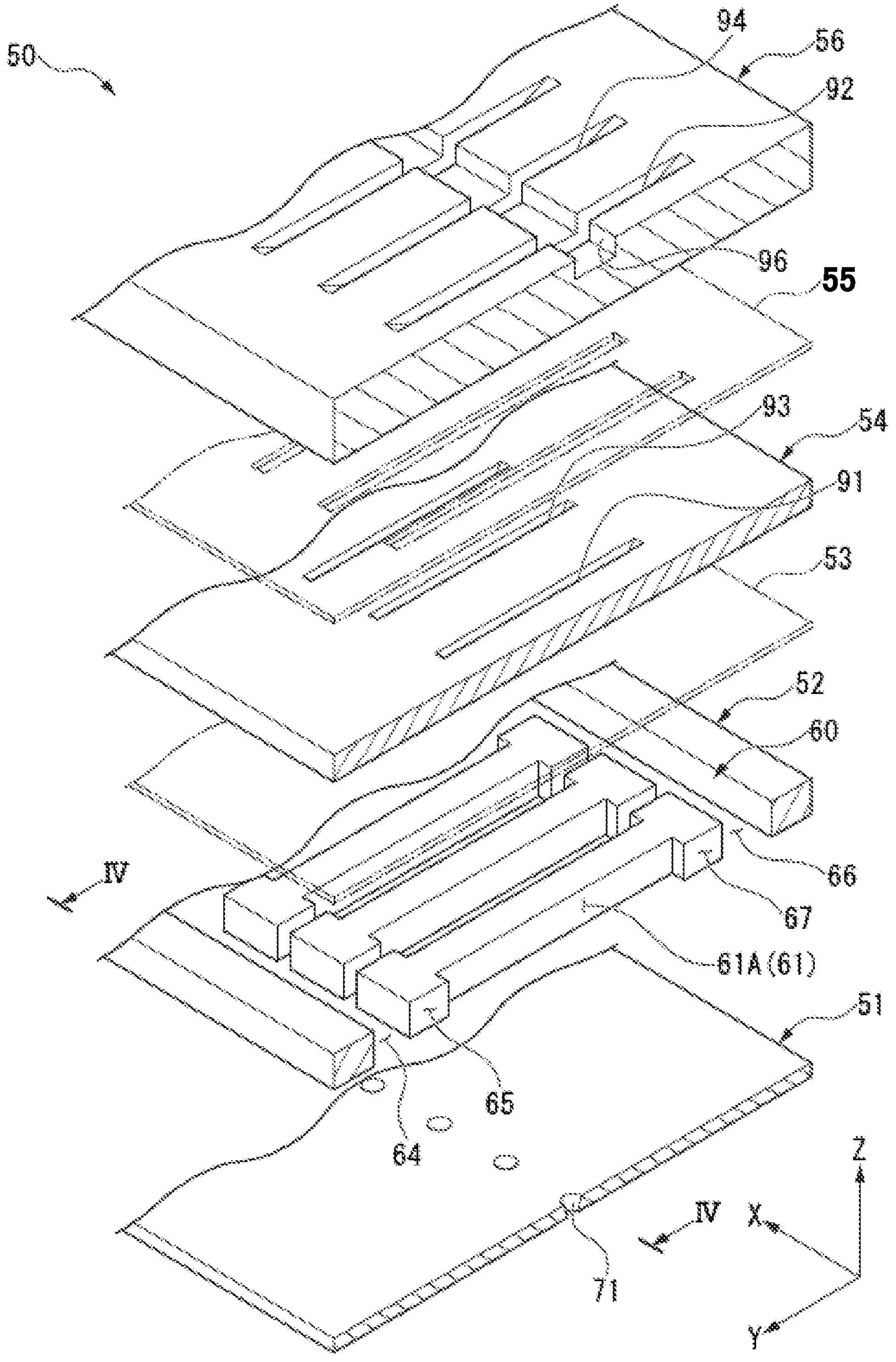
FIG. 3 is an exploded perspective view of a head chip according to the first embodiment.
Figure 4:
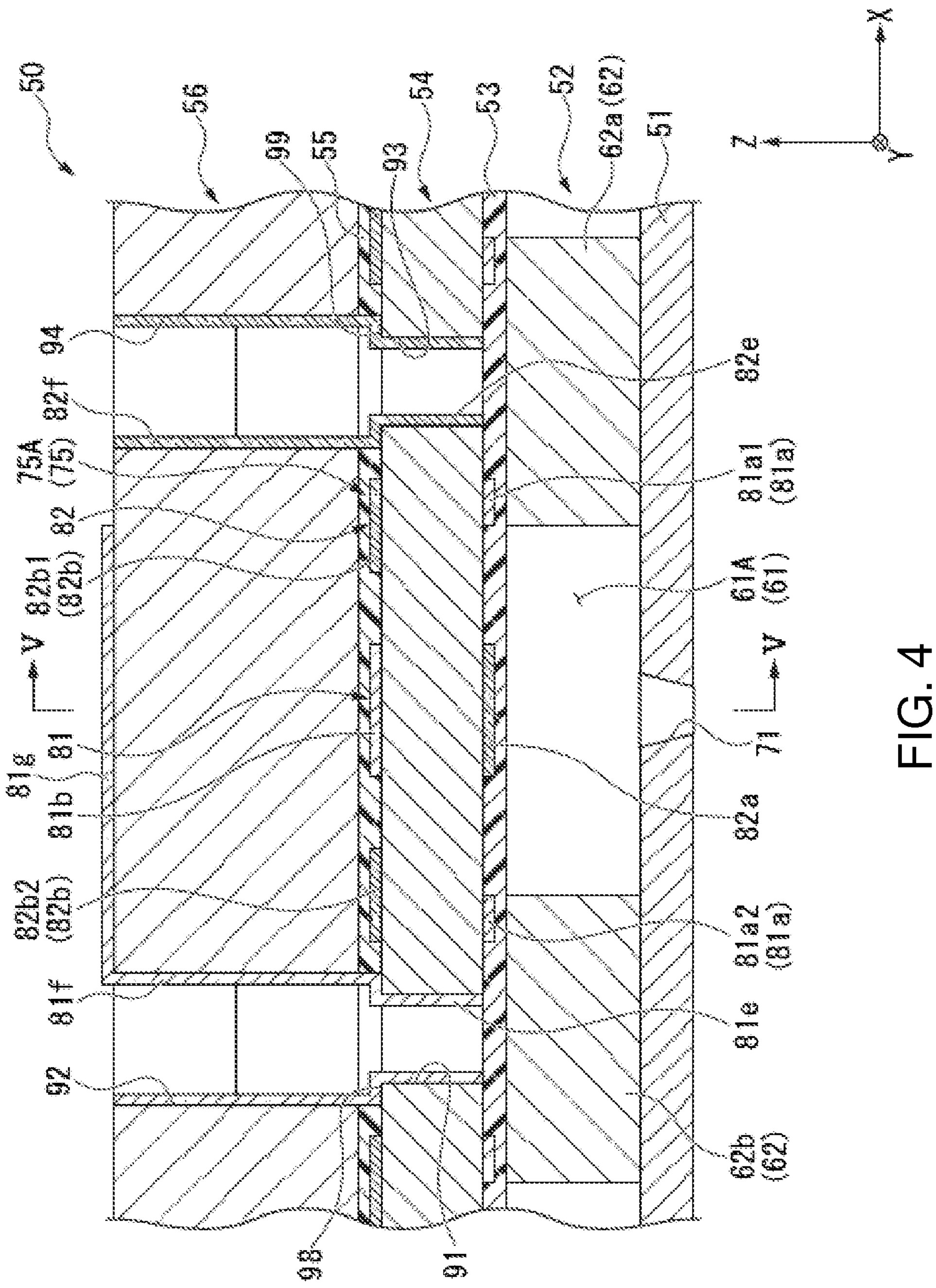
FIG. 4 is a cross-sectional view of the head chip corresponding to the line IV-IV shown in FIG. 3.
Figure 5:
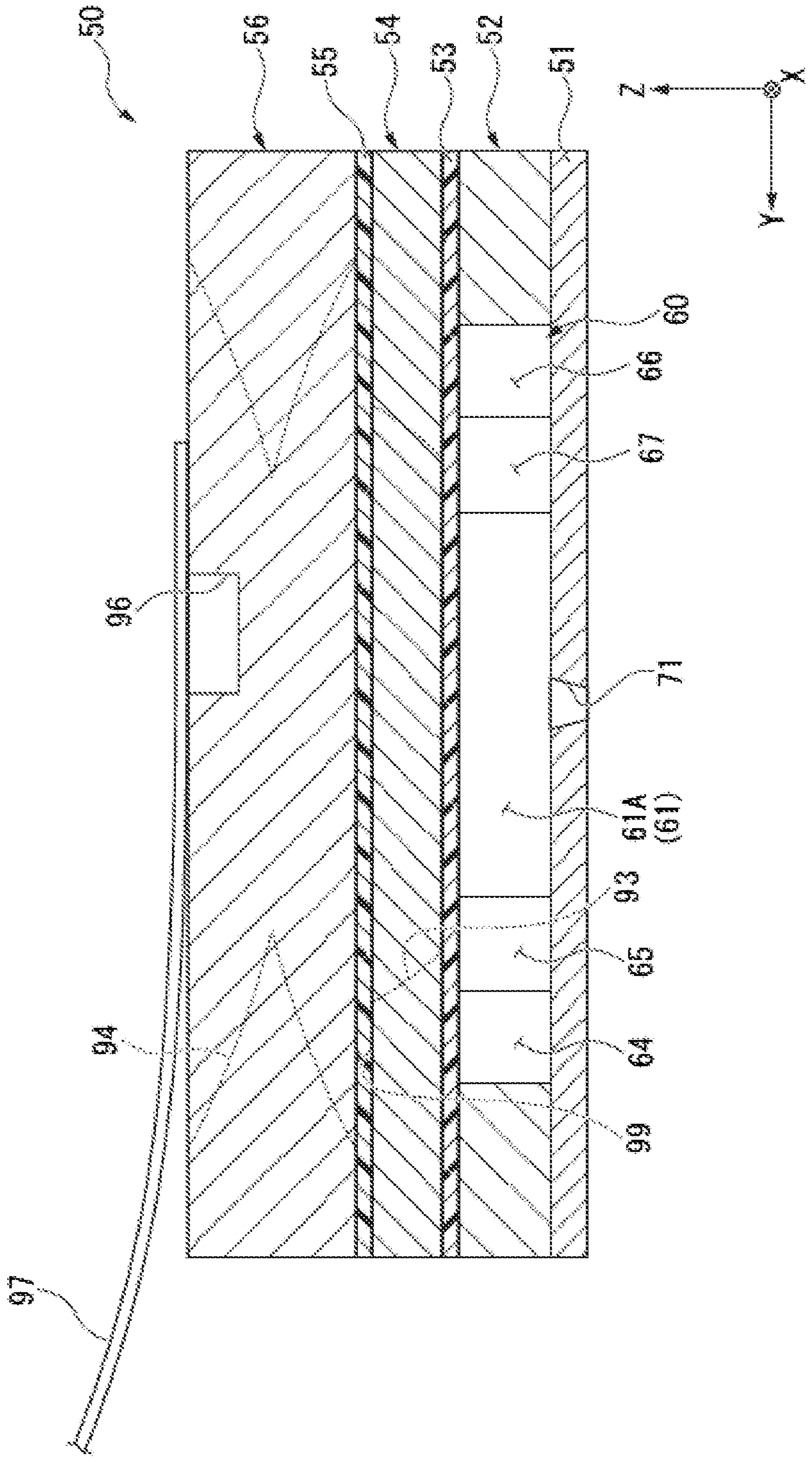
FIG. 5 is a cross-sectional view of the head chip corresponding to the line V-V shown in FIG. 4.

FIG. 3 is an exploded perspective view of the head chip 50. FIG. 4 is a cross-sectional view of the head chip 50 corresponding to the line IV-IV shown in FIG. 3. FIG. 5 is a cross-sectional view of the head chip 50 corresponding to the line V-V shown in FIG. 4.

The head chip 50 shown in FIG. 3 through FIG. 5 is a so-called recirculating side-shoot type head chip 50 which circulates the ink with the ink tank 4, and at the same time, ejects the ink from a central portion in an extending direction (the Y direction) in a pressure chamber 61 described later. The head chip 50 is provided with a nozzle plate 51, a flow channel member 52, a first film 53, an actuator plate 54, a second film 55, and a cover plate 56. In the following explanation, the description is presented in some cases defining a direction (+Z side) from the nozzle plate 51 toward the cover plate 56 along the Z direction as an upper side, and a direction (−Z side) from the cover plate 56 toward the nozzle plate 51 along the Z direction as a lower side.

The flow channel member 52 is shaped like a plate with a thickness direction set to the Z direction. The flow channel member 52 is formed of a material having ink resistance. As such a material, it is possible to adopt, for example, metal, metal oxide, glass, resin, and ceramics. The flow channel member 52 is provided with a flow channel 60 through which the ink circulates, and a plurality of pressure chambers 61 which is communicated with the flow channel 60, and which contains the ink. The flow channel 60 and the pressure chambers 61 penetrate the flow channel member 52 in the Z direction. The flow channel 60 and the pressure chambers 61 constitute a flow channel formation area in the first embodiment.

Figure 6:
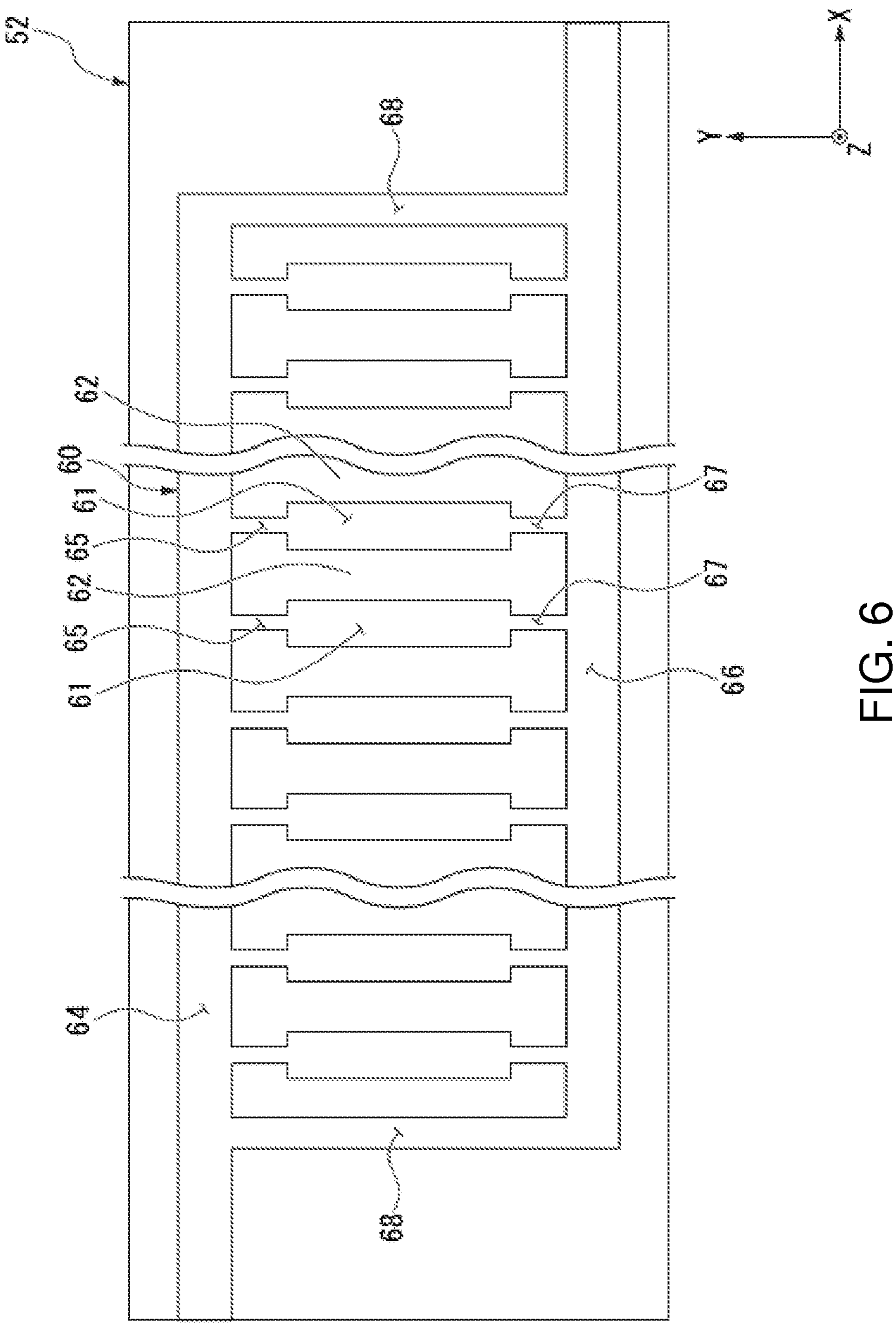
FIG. 6 is a plan view of a flow channel member related to the first embodiment.

FIG. 6 is a plan view of the flow channel member 52.

As shown in FIG. 6, the pressure chambers 61 are arranged side by side in the X direction at intervals. Therefore, in the flow channel member 52, a portion located between the pressure chambers 61 adjacent to each other constitutes a partition wall 62 for partitioning the pressure chambers 61 adjacent to each other in the X direction. The pressure chambers 61 are each formed like a groove linearly extending in the Y direction. The pressure chambers 61 each penetrate the flow channel member 52 in at least a part (a central portion in the Y direction in the first embodiment) in the Y direction. It should be noted that the configuration in which a channel extension direction coincides with the Y direction will be described in the first embodiment, but the channel extension direction can cross the Y direction. Further, a planar shape of the pressure chamber 61 is not limited to a rectangular shape (a shape with a longitudinal direction set to either one of the X direction and the Y direction, and a short-side direction set to the other thereof). The planar shape of the pressure chamber 61 can be a polygonal shape such as a square shape or a triangular shape, a circular shape, an elliptical shape, or the like.

The flow channel 60 includes an entrance-side common flow channel 64, entrance-side communication channels 65, an exit-side common flow channel 66, exit-side communication channels 67, and bypass channels 68.

The entrance-side common flow channel 64 extends in the X direction in a portion of the flow channel member 52, the portion being located at the +Y side of the pressure chambers 61. A −X-side end portion in the entrance-side common flow channel 64 is coupled to an entrance port (not shown). The entrance port is directly or indirectly coupled to the ink supply tube 21 (see FIG. 2). In other words, the ink flowing through the ink supply tube 21 is supplied to the entrance-side common flow channel 64 through the entrance port.

The entrance-side communication channels 65 respectively couple the entrance-side common flow channel 64 and the pressure chambers 61 to each other. Specifically, the entrance-side communication channels 65 are each branched toward the −Y side from a portion of the entrance-side common flow channel 64, the portion overlapping the pressure chamber 61 when viewed from the X direction. A −Y-side end portion in the entrance-side communication channel 65 is coupled to the pressure chamber 61.

The exit-side common flow channel 66 extends in the X direction in a portion of the flow channel member 52, the portion being located at the −Y side of the pressure chambers 61. A +X-side end portion in the exit-side common flow channel 66 is coupled to an exit port (not shown). The exit port is directly or indirectly coupled to the ink discharge tube 22 (see FIG. 2). In other words, the ink flowing through the exit-side common flow channel 66 is supplied to the ink discharge tube 22 through the exit port.

The exit-side communication channels 67 respectively couple the exit-side common flow channel 66 and the pressure chambers 61 to each other. Specifically, the exit-side communication channels 67 are each branched toward the +Y side from a portion of the exit-side common flow channel 66, the portion overlapping the pressure chamber 61 when viewed from the X direction. A +Y-side end portion in the exit-side communication channel 67 is coupled to the pressure chamber 61. In the first embodiment, the width in the X direction in each of the communication channels 65, 67 is narrower than the width in the X direction in the pressure chamber 61. Thus, it is possible to prevent so-called crosstalk that a pressure variation generated in one of the pressure chambers 61 is propagated to the other pressure chambers 61 through the communication channels 65, 67. It should be noted that the dimensions of the communication flow channels 65, 67 can arbitrarily be changed.

As shown in FIG. 4 and FIG. 5, the nozzle plate 51 is fixed to a lower surface of the flow channel member 52 with bonding or the like. The nozzle plate 51 becomes equivalent in planar shape to the flow channel member 52. Therefore, the nozzle plate 51 closes a lower end opening part of each of the flow channel 60 and the pressure chambers 61. In the first embodiment, the nozzle plate 51 is formed of a resin material such as polyimide so as to have a thickness in a range of several tens through one hundred and several tens of micrometers. It should be noted that it is possible for the nozzle plate 51 to have a single layer structure or a laminate structure with a metal material (SUS, Ni—Pd, or the like), glass, silicone, or the like besides the resin material.

The nozzle plate 51 is provided with a plurality of nozzle holes 71 penetrating the nozzle plate 51 in the Z direction. The nozzle holes 71 are arranged at intervals in the X direction. The nozzle holes 71 are each communicated with corresponding one of the pressure chambers 61 in a central portion in the X direction and the Y direction. In the first embodiment, each of the nozzle holes 71 is formed to have, for example, a taper shape having an inner diameter gradually decreasing along a direction from the upper side toward the lower side. In the first embodiment, there is described the configuration in which the plurality of pressure chambers 61 and the plurality of nozzle holes 71 are aligned in the X direction, but this configuration is not a limitation. Defining the plurality of pressure chambers 61 and the plurality of nozzle holes 71 arranged in the X direction as a nozzle array, it is possible to dispose two or more nozzle arrays at intervals in the Y direction. In this case, defining the number of nozzle arrays as n, it is preferable for an arrangement pitch in the Y direction of the nozzle holes 71 (the pressure chambers 61) in one of the nozzle arrays to be arranged so as to be shifted by 1/n pitch with respect to the arrangement pitch of the nozzle holes 71 in another nozzle array adjacent to that nozzle array.

The first film 53 is fixed to an upper surface of the flow channel member 52 with bonding or the like. The first film 53 is arranged throughout the entire area of the upper surface of the flow channel member 52. Thus, the first film 53 closes an upper end opening part of each of the flow channel 60 and the pressure chambers 61. The first film 53 is formed of an elastically deformable material having an insulating property and ink resistance. As such a material, the first film 53 is formed of, for example, a resin material (a polyimide type, an epoxy type, a polypropylene type, and so on). In the first embodiment, the term "elastically deformable" means that the material is lower in compressive elasticity modulus compared to a member adjacent thereto in the Z direction in a state in which two or more members are stacked on one another. In other words, the first film 53 is lower in compressive elasticity modulus than the flow channel member 52 and the actuator plate 54.

The actuator plate 54 is fixed to an upper surface of the first film 53 with bonding or the like with the thickness direction set to the Z direction. The planar shape of the actuator plate 54 is larger than the planar shape of the flow channel member 52. Therefore, the actuator plate 54 is opposed to the pressure chambers 61 in the Z direction across the first film 53. It should be noted that the actuator plate 54 is not limited to the configuration of covering the pressure chambers 61 in a lump, but can individually be disposed for each of the pressure chambers 61.

The actuator plate 54 is formed of a piezoelectric material such as PZT (lead zirconate titanate). The actuator plate 54 is set so that a polarization direction is a direction toward the +Z side. On both surfaces of the actuator plate 54, there are formed drive interconnections 75. The actuator plate 54 is configured so as to be able to be deformed in the Z direction by an electric field being generated by a voltage applied by the drive interconnections 75. The actuator plate 54 expands or contracts the volume in the pressure chambers 61 due to the deformation in the Z direction to thereby eject the ink from the inside of the pressure chambers 61. It should be noted that the configuration of the drive interconnections 75 will be described later.

The second film 55 is fixed to an upper surface of the actuator plate 54 with bonding or the like. In the first embodiment, the second film 55 covers the entire area of the upper surface of the actuator plate 54. The second film 55 is formed of an elastically deformable material having an insulating property. As such a material, it is possible to adopt substantially the same material as that of the first film 53. In other words, the second film 55 is lower in compressive elasticity modulus than the flow channel member 52 and the actuator plate 54.

The cover plate 56 is fixed to an upper surface of the second film 55 with bonding or the like with the thickness direction set to the Z direction. The cover plate 56 is thicker in thickness in the Z direction than the actuator plate 54, the flow channel member 52, and the films 53, 55. In the first embodiment, the cover plate 56 is formed of a material (e.g., metal oxide, glass, resin, or ceramics) having an insulating property. The cover plate 56 is higher in compressive elasticity modulus than at least the second film 55.

Figure 7:
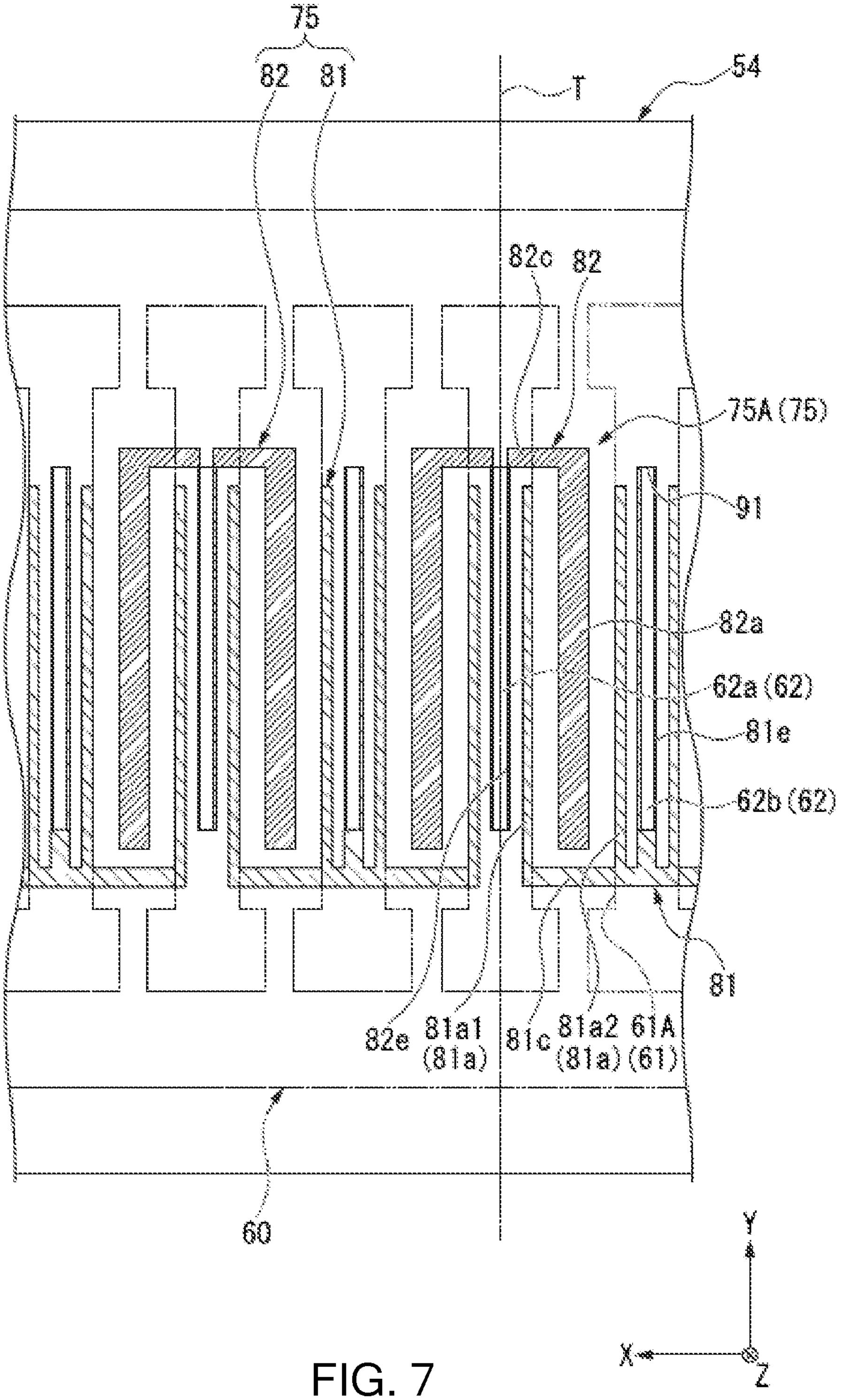
FIG. 7 is a bottom view of an actuator plate related to the first embodiment.
Figure 8:
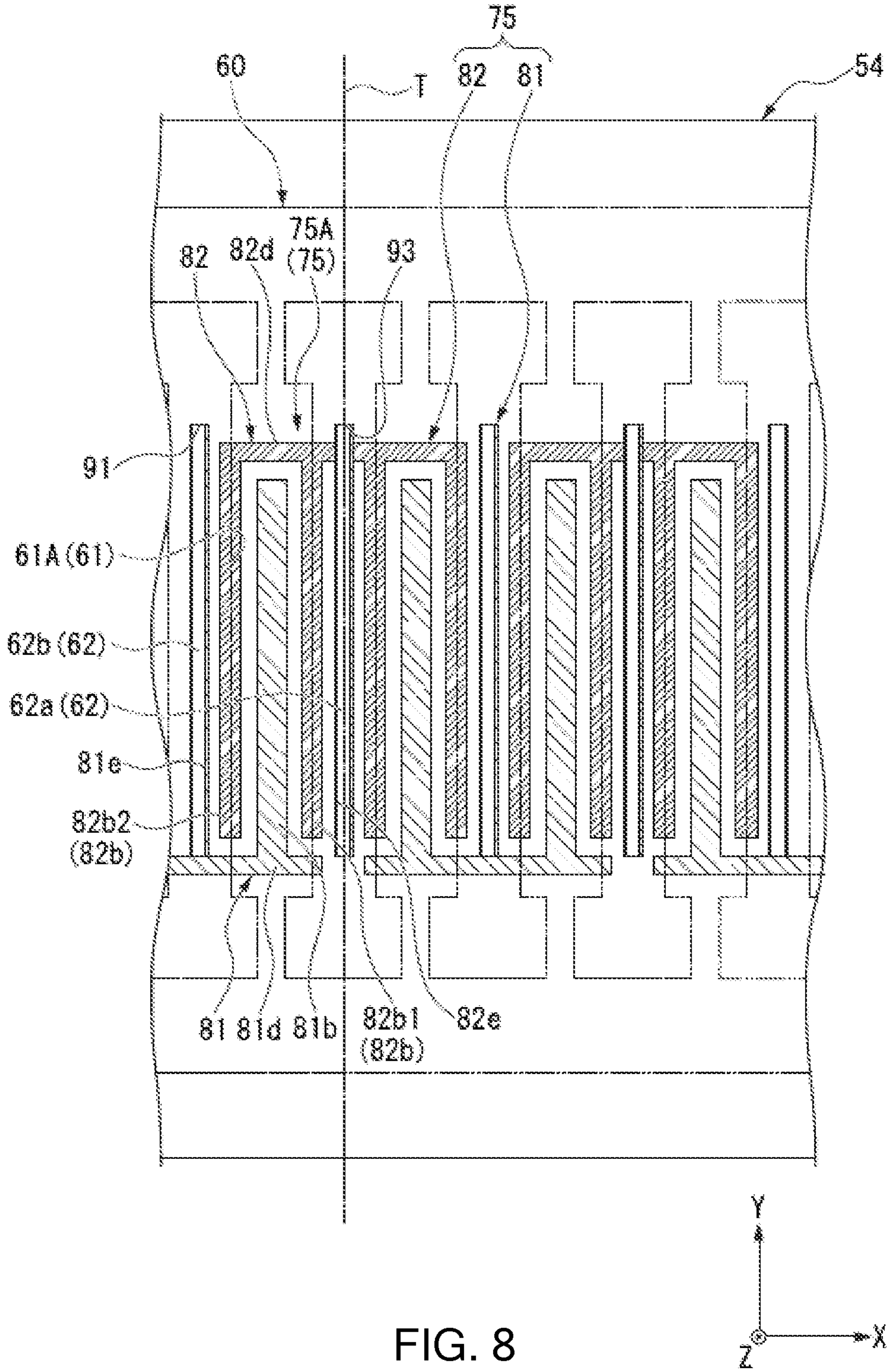
FIG. 8 is a plan view of the actuator plate related to the first embodiment.

Subsequently, a structure of the drive interconnections 75 will be described. FIG. 7 is a bottom view of the actuator plate 54. FIG. 8 is a plan view of the actuator plate 54. The drive interconnections 75 are disposed so as to correspond to the pressure chambers 61. The drive interconnections 75 corresponding to the pressure chambers 61 adjacent to each other are formed line-symmetrically with reference to a symmetry axis T along the Y direction. In the following explanation, drive interconnections 75A disposed so as to correspond to one pressure chamber 61A out of the plurality of pressure chambers 61 are described as an example, and the description of the drive interconnections 75 corresponding other pressure chambers 61 will arbitrarily be omitted.

As shown in FIG. 7 and FIG. 8, the drive interconnections 75A consist of a common interconnection 81 and an individual interconnection 82.

The common interconnection 81 is provided with first common electrodes 81*a*, a second common electrode 81*b*, a lower-surface patterned interconnection 81*c*, an upper-surface patterned interconnection 81*d*, a first through interconnection 81*e*, a second through interconnection 81*f*, and a common pad 81*g*. It should be noted that in the common interconnection 81, it is preferable to dispose an insulator (e.g., $SiO_2$) not shown between the actuator plate 54 and the portions (the lower-surface patterned interconnection 81*c*, the upper-surface patterned interconnection 81*d*, the first through interconnection 81*e*, the second through interconnection 81*f*, and the common pad 81*g*) other than the common electrodes 81*a*, 81*b*.

As shown in FIG. 4 and FIG. 7, the first common electrodes 81*a* are formed at positions overlapping the respective partition walls 62 when viewed from the Z direction on a lower surface of the actuator plate 54. Specifically, when viewed from the Z direction, a whole of the first common electrode 81*a* (hereinafter referred to as a +X-side common electrode 81*a*1) located at the +X side out of the first common electrodes 81*a* overlaps the partition wall 62 (hereinafter referred to as a partition wall 62*a*) located at the +X side out of the partition walls 62 for partitioning the pressure chambers 61. On the other hand, when viewed from the Z direction, a whole of the first common electrode 81*a* (hereinafter referred to as a −X-side common electrode 81*a*2) located at the −X side out of the first common electrodes 81*a* overlaps the partition wall 62 (hereinafter referred to as a partition wall 62*b*) located at the −X side out of the partition walls 62 for partitioning the pressure chambers 61. The first common electrodes 81*a* linearly extend in the Y direction with a length equivalent to the length of the pressure chamber 61.

As shown in FIG. 4 and FIG. 8, the second common electrode 81*b* is arranged at a position which overlaps the corresponding one of the pressure chambers 61 when viewed from the Z direction, and which fails to overlap the first common electrode 81*a* when viewed from the Z direction on the upper surface of the actuator plate 54. In the illustrative example, the second common electrode 81*b* is formed in an area which includes a central portion in the X direction in the pressure chamber 61, and which corresponds to no smaller than a third of the width in the X direction in the pressure chamber 61. The second common electrode 81*b* linearly extends in the Y direction with a length equivalent to the length of the pressure chamber 61. It should be noted that the width in the X direction and so on of the second common electrode 81*b* can arbitrarily be changed providing the second common electrode 81*b* is formed at the position overlapping the pressure chamber 61 when viewed from the Z direction.

As shown in FIG. 4 and FIG. 7, the lower-surface patterned interconnection 81*c* is coupled to the first common electrodes 81*a* in a lump on the lower surface of the actuator plate 54. The lower-surface patterned interconnection 81*c* extends in the X direction in a state of being coupled to the −Y-side end portion in each of the first common electrodes 81*a*. The −X-side end portion in the lower-surface patterned interconnection 81*c* extends to a position overlapping a central portion in the X direction in the partition wall 62*b* when viewed from the Z direction.

As shown in FIG. 4 and FIG. 8, the upper-surface patterned interconnection 81*d* is coupled to the second common electrode 81*b* on the upper surface of the actuator plate 54. The upper-surface patterned interconnection 81*d* extends from the −Y-side end portion in the second common electrode 81*b* toward the −X side. The −X-side end portion in the upper-surface patterned interconnection 81*d* extends to a position overlapping the central portion in the X direction in the partition wall 62*b* when viewed from the Z direction.

As shown in FIG. 4, FIG. 7, and FIG. 8, the first through interconnection 81*e* couples the lower-surface patterned interconnection 81*c* and the upper-surface patterned interconnection 81*d* to each other. The first through interconnection 81*e* is disposed so as to penetrate the actuator plate 54 in the Z direction. Specifically, in the actuator plate 54, a common interconnecting first hole 91 is formed in a portion located at the −X side of the −X-side common electrode 81*a*2. In the first embodiment, the common interconnecting first hole 91 is formed in a portion of the actuator plate 54, the portion overlapping the central portion in the X direction of the partition wall 62*b* when viewed from the Z direction. The common interconnecting first hole 91 extends in the Y direction along the −X-side common electrode 81*a*2. The common interconnecting first hole 91 divides the actuator plate 54 between the pressure chambers 61 adjacent to each other. In the illustrative example, the length in the Y direction of the common interconnecting first hole 91 is set to a length slightly shorter than the −X-side common electrode 81*a*1, and shorter than the pressure chamber 61. It should be noted that the length in the Y direction of the common interconnecting first hole 91 can arbitrarily be changed.

The first through interconnection 81*e* is formed on an inner surface of the common interconnecting first hole 91. The first through interconnection 81*e* is formed at least throughout the entire area in the Z direction on the inner surface of the common interconnecting first hole 91. The first through interconnection 81*e* is coupled to the lower-surface patterned interconnection 81*c* at a lower-end opening edge of the common interconnecting first hole 91 on the one hand, and is coupled to the upper-surface patterned interconnection 81*d* at an upper-end opening edge of the common interconnecting first hole 91 on the other hand. It should be noted that the first through interconnection 81*e* can be formed throughout the entire circumference in the inner surface of the common interconnecting first hole 91.

Figure 9:
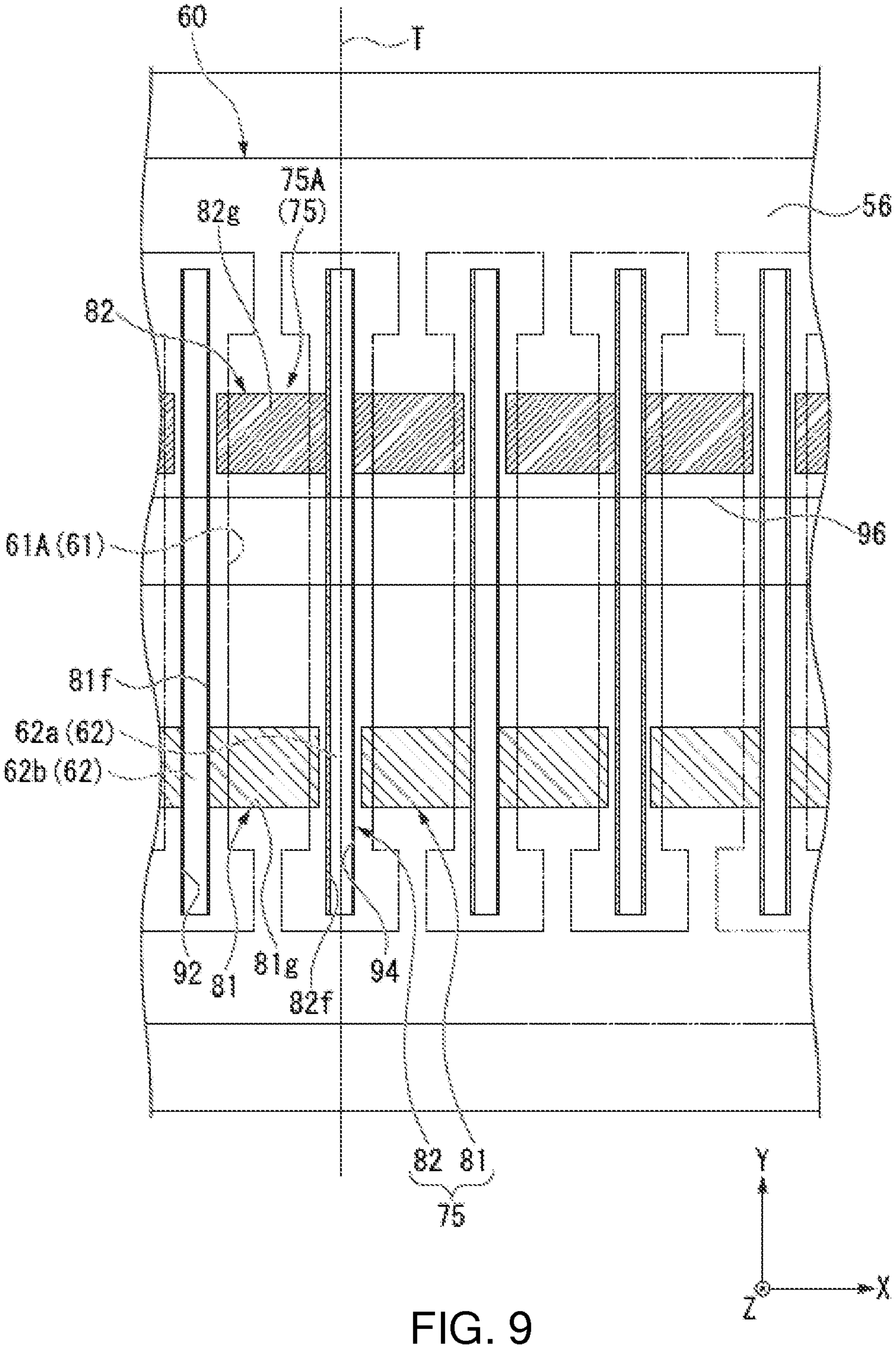
FIG. 9 is a plan view of a cover plate related to the first embodiment.

FIG. 9 is a plan view of the cover plate 56.

As shown in FIG. 4 and FIG. 9, the second through interconnection 81*f* leads the first through interconnection 81*e* to the upper surface of the cover plate 56. The second through interconnection 81*f* is disposed so as to penetrate the second film 55 and the cover plate 56 in the Z direction. Specifically, at a position in the second film 55 and the cover plate 56 overlapping the common interconnecting first hole 91 when viewed from the Z direction, there is formed a common interconnecting second hole 92. The common interconnecting second hole 92 is an elongated groove extending in the Y direction similarly to the common interconnecting first hole 91. The common interconnecting second hole 92 is communicated with the common interconnecting first hole 91. The common interconnecting second hole 92 is made one-size larger than the outer shape of the common interconnecting first hole 91 when viewed from the Z direction. Therefore, in the common interconnecting second hole 92, in a boundary portion with the common interconnecting first hole 91, there is formed a step surface 98 formed of the upper surface of the actuator plate 54.

The second through interconnection 81*f* is formed on an inner surface of the common interconnecting second hole 92. The second through interconnection 81*f* is formed at least throughout the entire area in the Z direction on the inner surface of the common interconnecting second hole 92. The second through interconnection 81*f* is coupled to the first through interconnection 81*e* on a lower-end opening edge of the common interconnecting second hole 92 through the step surface 98 described above.

As shown in FIG. 9, the common pad 81*g* is formed on the upper surface of the cover plate 56. In the first embodiment, the upper surface of the cover plate 56 constitutes a pad formation surface disposed so as to face to an opposite side in the Z direction to the flow channel member 52. The common pad 81*g* extends in the X direction on a portion of the upper surface of the cover plate 56, the portion overlapping the pressure chamber 61 when viewed from the Z direction. A −X-side end portion in the common pad 81*g* is coupled to the second through interconnection 81*f* on an upper-end opening edge of the common interconnecting second hole 92. It should be noted that it is possible for the common pad 81*g* to partially overlap the flow channel 60 when viewed from the Z direction.

As shown in FIG. 7 and FIG. 8, the individual interconnection 82 is provided with a first individual electrode 82*a*, second individual electrodes 82*b*, a lower-surface patterned interconnection 82*c*, an upper-surface patterned interconnection 82*d*, a first through interconnection 82*e*, a second through interconnection 82*f*, and an individual pad 82*g*. It should be noted that in the individual interconnection 82, it is preferable to dispose an insulator (e.g., $SiO_2$) not shown between the actuator plate 54 and the portions (the lower-surface patterned interconnection 82*c*, the upper-surface patterned interconnection 82*d*, the first through interconnection 82*e*, the second through interconnection 82*f*, and the individual pad 82*g*) other than the individual electrodes 82*a*, 82*b*.

As shown in FIG. 4 and FIG. 7, the first individual electrode 82*a* is formed between the first common electrodes 81*a* on the lower surface of the actuator plate 54. The first individual electrode 82*a* extends in the Y direction in a state of being separated in the X direction from the first common electrodes 81*a*. The whole of the first individual electrode 82*a* overlaps the corresponding pressure chamber 61 when viewed from the Z direction. The first individual electrode 82*a* generates a potential difference from the first common electrodes 81*a*. At least a part of the first individual electrode 82*a* overlaps the second common electrode 81*b* when viewed from the Z direction. Therefore, the first individual electrode 82*a* generates a potential difference from the second common electrode 81*b*.

As shown in FIG. 4 and FIG. 8, the second individual electrodes 82*b* are respectively formed in portions located at both sides in the X direction with respect to the second common electrode 81*b* on the upper surface of the actuator plate 54. The second individual electrodes 82*b* extend in the Y direction in a state of being separated in the X direction from the second common electrode 81*b*. The second individual electrodes 82*b* each generate a potential difference from the second common electrode 81*b*. The width in the X direction in the second individual electrode 82*b* is narrower than the width in the X direction in the first common electrodes 81*a*.

As shown in FIG. 4 and FIG. 8, out of the second individual electrodes 82*b*, the second individual electrode 82*b* (hereinafter referred to as a +X-side individual electrode 82*b*1) located at the +X side generates a potential difference with the +X-side common electrode 81*a*1. A part of the +X-side individual electrode 82*b*1 overlaps the partition wall 62*a* when viewed from the Z direction. The +X-side individual electrode 82*b*1 is opposed to the +X-side common electrode 81*a*1 in the Z direction on the partition wall 62*a*. A remaining part of the +X-side individual electrode 82*b*1 spreads toward the −X side with respect to the partition wall 62*a*. In other words, the remaining part of the +X-side individual electrode 82*b*1 overlaps a part of the pressure chamber 61 when viewed from the Z direction.

In contrast, out of the second individual electrodes 82*b*, the second individual electrode 82*b* (hereinafter referred to as a −X-side individual electrode 82*b*2) located at the −X side generates a potential difference with the −X-side common electrode 81*a*2. A part of the −X-side individual electrode 82*b*2 overlaps the partition wall 62*b* when viewed from the Z direction. The −X-side individual electrode 82*b*2 is opposed to the −X-side common electrode 81*a*2 in the Z direction on the partition wall 62*b*. A remaining part of the −X-side individual electrode 82*b*2 spreads toward the +X side with respect to the partition wall 62*b*. In other words, the remaining part of the −X-side individual electrode 82*b*2 overlaps a part of the pressure chamber 61 when viewed from the Z direction. It should be noted that between the pressure chambers 61 adjacent to each other, the +X-side individual electrode 82*b*1 in one of the pressure chambers 61 and the −X-side individual electrode 82*b*2 in the other of the pressure chambers 61 are at a distance from each other in the X direction on the partition wall 62.

As shown in FIG. 7, the lower-surface patterned interconnection 82*c* is coupled to the first individual electrode 82*a* on the lower surface of the actuator plate 54. The lower-surface patterned interconnection 82*c* extends from the +Y-side end portion in the first individual electrode 82*a* toward the +X side. The +X-side end portion in the lower-surface patterned interconnection 82*c* extends to a position overlapping a central portion in the X direction in the partition wall 62*a* when viewed from the Z direction.

As shown in FIG. 8, the upper-surface patterned interconnection 82*d* is coupled to the second individual electrodes 82*b* in a lump on the upper surface of the actuator plate 54. The upper-surface patterned interconnection 82*d* extends in the X direction in a state of being coupled to the +Y-side end portion in each of the second individual electrodes 82*b*. The +X-side end portion in the upper-surface patterned interconnection 82*d* extends to a position overlapping the central portion in the X direction in the partition wall 62*a* when viewed from the Z direction.

As shown in FIG. 4, FIG. 7, and FIG. 8, the first through interconnection 82*e* couples the lower-surface patterned interconnection 82*c* and the upper-surface patterned interconnection 82*d* to each other. The first through interconnection 82*e* is disposed so as to penetrate the actuator plate 54 in the Z direction. Specifically, in the actuator plate 54, an individual interconnecting first hole 93 is formed in a portion located at the +X side of the +X-side individual electrode 82*b*1. In the first embodiment, the individual interconnecting first hole 93 is formed in a portion of the actuator plate 54, the portion overlapping the central portion in the X direction of the partition wall 62*a* when viewed from the Z direction. The individual interconnecting first hole 93 extends in the Y direction along the +X-side individual electrode 82*b*1. The individual interconnecting first hole 93 divides the actuator plate 54 between the pressure chambers 61 adjacent to each other. In the illustrative example, the length in the Y direction of the individual interconnecting first hole 93 is set to a length slightly shorter than the +X-side individual electrode 82*b*1, and shorter than the pressure chamber 61. It should be noted that the length in the Y direction of the individual interconnecting first hole 93 can arbitrarily be changed.

On an inner surface of the individual interconnecting first hole 93, there are formed the first through interconnections 82*e* of the pressure chambers 61 adjacent to each other in a state of being separated from each other. In the following description, the first through interconnection 82*e* related to the drive interconnection 75A will be described. The first through interconnection 82*e* is formed at least throughout the entire area in the Z direction on the inner surface of the individual interconnecting first hole 93. The first through interconnection 82*e* is coupled to the lower-surface patterned interconnection 82*c* at a lower-end opening edge of the individual interconnecting first hole 93 on the one hand, and is coupled to the upper-surface patterned interconnection 82*d* at an upper-end opening edge of the individual interconnecting first hole 93 on the other hand. In the illustrative example, the first through interconnections 82*e* corresponding to the pressure chambers 61 adjacent to each other are respectively formed on the surfaces opposed to each other in the X direction out of the inner surfaces of the individual interconnecting first hole 93. Therefore, the first through interconnections 82*e* corresponding to the pressure chambers 61 adjacent to each other are segmentalized in the both end portions in the Y direction out of the individual interconnecting first hole 93.

As shown in FIG. 4 and FIG. 9, the second through interconnection 82*f* leads the first through interconnection 82*e* to the upper surface of the cover plate 56. The second through interconnection 82*f* is disposed so as to penetrate the second film 55 and the cover plate 56 in the Z direction. Specifically, at a position in the second film 55 and the cover plate 56 overlapping the individual interconnecting first hole 93 when viewed from the Z direction, there is formed an individual interconnecting second hole 94. The individual interconnecting second hole 94 is an elongated groove extending in the Y direction similarly to the individual interconnecting first hole 93. The individual interconnecting second hole 94 is communicated with the individual interconnecting first hole 93. The individual interconnecting second hole 94 is made one-size larger than the outer shape of the individual interconnecting first hole 93 when viewed from the Z direction. Therefore, in the individual interconnecting second hole 94, in a boundary portion with the individual interconnecting first hole 93, there is formed a step surface 99 formed of the upper surface of the actuator plate 54.

On an inner surface of the individual interconnecting second hole 94, there are formed the second through interconnections 82*f* of the pressure chambers 61 adjacent to each other in a state of being separated from each other. The second through interconnection 82*f* is formed at least throughout the entire area in the Z direction on the inner surface of the individual interconnecting second hole 94. The second through interconnection 82*f* is coupled to the first through interconnection 82*e* on a lower-end opening edge of the individual interconnecting second hole 94 through the step surface 99 described above. In the illustrative example, the second through interconnections 82*f* corresponding to the pressure chambers 61 adjacent to each other are respectively formed on the surfaces opposed to each other in the X direction out of the inner surfaces of the individual interconnecting second hole 94. Therefore, the second through interconnections 82*f* corresponding to the pressure chambers 61 adjacent to each other are segmentalized in the both end portions in the Y direction out of the individual interconnecting second hole 94.

The individual pad 82*g* is formed on the upper surface of the cover plate 56. The individual pad 82*g* extends in the X direction on a portion of the upper surface of the cover plate 56, the portion overlapping the pressure chamber 61 when viewed from the Z direction. A −X-side end portion in the individual pad 82*g* is coupled to the second through interconnection 82*f* on an upper-end opening edge of the individual interconnecting second hole 94. It should be noted that it is possible for the individual pad 82*g* to partially overlap the flow channel 60 when viewed from the Z direction.

As shown in FIG. 4, in the drive interconnections 75, a portion opposed to the flow channel member 52 is covered with the first film 53. Specifically, in the drive interconnections 75, the first common electrodes 81*a*, the first individual electrode 82*a*, the lower-surface patterned interconnections 81*c*, 82*c*, and the first through interconnections 81*e*, 82*e* are covered with the first film 53. In contrast, in the drive interconnection 75, a portion formed on the upper surface of the actuator plate 54 is covered with the second film 55. Specifically, in the drive interconnections 75, the second common electrode 81*b*, the second individual electrodes 82*b*, the upper-surface patterned interconnections 81*d*, 82*d*, and the first through interconnections 81*e*, 82*e* are covered with the second film 55.

As shown in FIG. 5 and FIG. 9, on the upper surface of the cover plate 56, there is formed a common separation groove 96. The common separation groove 96 extends in the X direction so as to traverse the pressure chambers 61 at a portion of the upper surface of the cover plate 56, the portion being located between the common pad 81*g* and the individual pad 82*g*. To the upper surface of the cover plate 56, there is pressure-bonded a flexible printed board 97. The flexible printed board 97 is mounted on the common pad 81*g* and the individual pad 82*g* on the upper surface of the cover plate 56. In other words, the mounting portion in the flexible printed board 97 on the common pad 81*g* and the individual pad 82*g* overlaps the pressure chamber 61 when viewed from the Z direction. The flexible printed board 97 is pulled out upward. It should be noted that the common interconnections 81 (the common pads 81*g*) corresponding to the plurality of pressure chambers 61 are commonalized on the flexible printed board 97.

[Operation Method of Printer 1]

Then, there will hereinafter be described when recording a character, a figure, or the like on the recording target medium P using the printer 1 configured as described above.

It should be noted that it is assumed that as an initial state, the sufficient ink having colors different from each other is respectively encapsulated in the four ink tanks 4 shown in FIG. 1. Further, there is provided a state in which the inkjet heads 5 are filled with the ink in the ink tanks 4 via the ink circulation mechanisms 6, respectively.

Under such an initial state, when making the printer 1 operate, the recording target medium P is conveyed toward the +X side while being pinched by the rollers 11, 12 of the conveying mechanisms 2, 3. Further, by the carriage 29 moving in the Y direction at the same time, the inkjet heads 5 mounted on the carriage 29 reciprocate in the Y direction.

While the inkjet heads 5 reciprocate, the ink is arbitrarily ejected toward the recording target medium P from each of the inkjet heads 5. Thus, it is possible to perform recording of the character, the image, and the like on the recording target medium P.

Here, the operation of each of the inkjet heads 5 will hereinafter be described in detail.

In such a recirculating side-shoot type inkjet head 5 as in the first embodiment, first, by making the pressure pump 24 and the suction pump 25 shown in FIG. 2 operate, the ink is circulated in the circulation flow channel 23. In this case, the ink circulating through the ink supply tube 21 is supplied to the inside of each of the pressure chambers 61 through the entrance-side common flow channel 64 and the entrance-side communication channels 65. The ink supplied to the inside of each of the pressure chambers 61 circulates through the pressure chamber 61 in the Y direction. Subsequently, the ink is discharged to the exit-side common ink channel 66 through the exit-side communication channels 67, and is then returned to the ink tank 4 through the ink discharge tube 22. Thus, it is possible to circulate the ink between the inkjet head 5 and the ink tank 4.

Then, when the reciprocation of the inkjet heads 5 is started due to the translation of the carriage 29 (see FIG. 1), the drive voltages are applied between the common electrodes 81*a*, 81*b* and the individual electrodes 82*a*, 82*b* via the flexible printed boards 97. On this occasion, the common electrodes 81*a*, 81*b* are set at a reference potential GND, and the individual electrodes 82*a*, 82*b* are set at a drive potential Vdd to apply the drive voltage.

Figure 10:
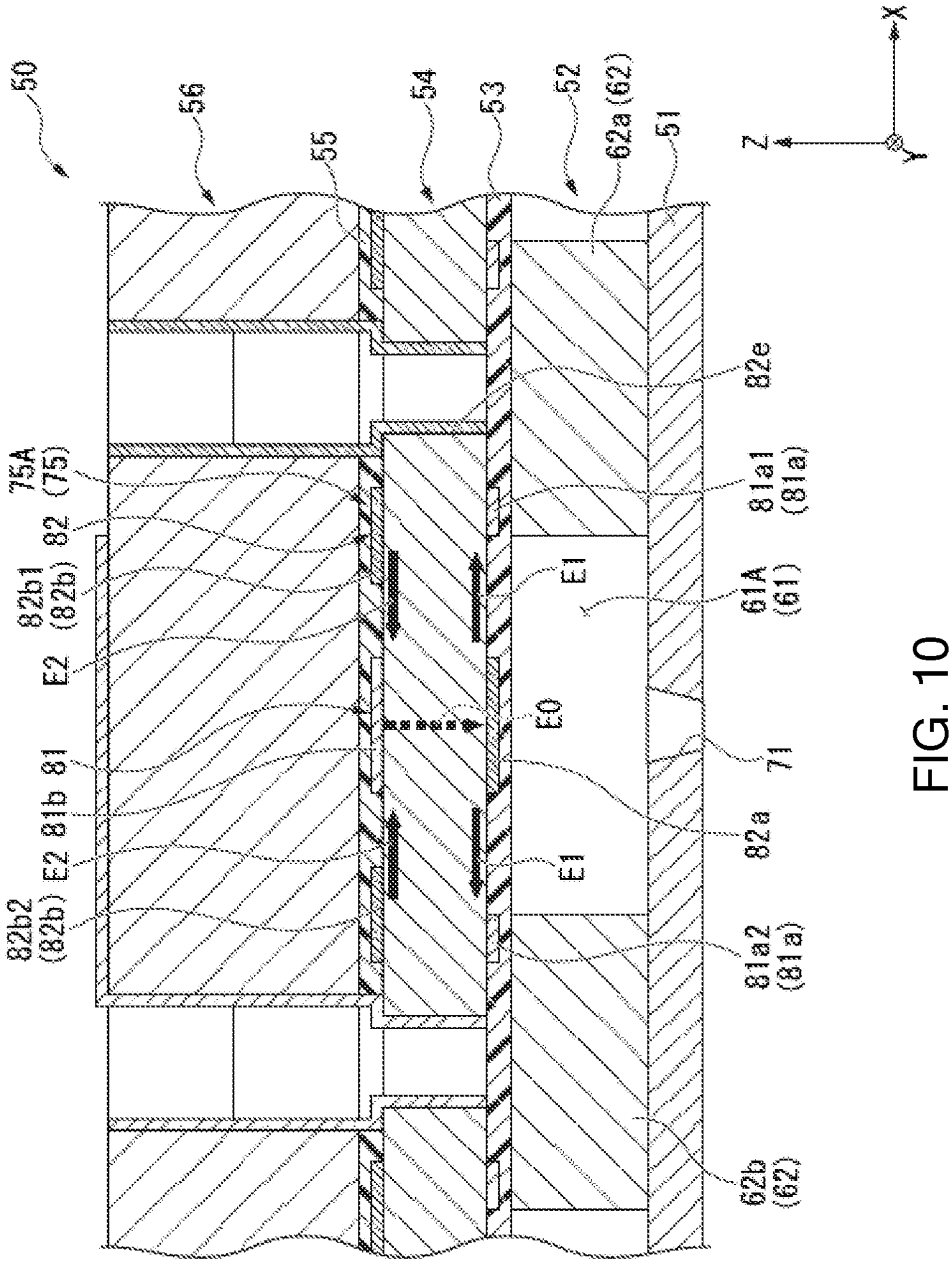
FIG. 10 is an explanatory diagram for explaining a behavior of deformation when ejecting ink regarding the head chip according to the first embodiment.

FIG. 10 is an explanatory diagram for explaining a behavior of deformation when ejecting the ink regarding the head chip 50.

As shown in FIG. 10, due to the application of the drive voltage, the potential difference occurs in the X direction between the first common electrodes 81*a* and the first individual electrode 82*a*, and between the second common electrode 81*b* and the second individual electrodes 82*b*. Due to the potential difference having occurred in the X direction, an electric field occurs in the actuator plate 54 in a direction perpendicular to the polarization direction (the Z direction). As a result, the thickness-shear deformation occurs in the actuator plate 54 in the Z direction due to the shear mode. Specifically, on the lower surface of the actuator plate 54, between the first common electrodes 81*a* and the first individual electrode 82*a*, there occurs the electric field in a direction of coming closer to each other in the X direction (see arrows E1). On the upper surface of the actuator plate 54, between the second common electrode 81*b* and the second individual electrodes 82*b*, there occurs the electric field in a direction of getting away from each other in the X direction (see arrows E2). As a result, in the actuator plate 54, a shear deformation occurs upward as proceeding from the both end portions toward the central portion in the X direction in a portion corresponding to each of the pressure chambers 61. Meanwhile, the potential difference occurs in the Z direction between the first common electrodes 81*a* and the second individual electrodes 82*b*, and between the first individual electrode 82*a* and the second common electrode 81*b*. Due to the potential difference having occurred in the Z direction, an electric field occurs (see an arrow E0) in the actuator plate 54 in a direction parallel to the polarization direction (the Z direction). As a result, a stretch and shrink deformation occurs in the actuator plate 54 in the Z direction due to a bend mode. In other words, in the head chip 50 according to the first embodiment, it results that both of the deformation caused by the shear mode and the deformation caused by the bend mode in the actuator plate 54 occur in the Z direction. Specifically, due to the application of the drive voltage, the actuator plate 54 deforms in a direction of getting away from the pressure chamber 61. Thus, the volume in the pressure chamber 61 increases. Subsequently, when making the drive voltage zero, the actuator plate 54 is restored to thereby urge the volume in the pressure chamber 61 to be restored. In the process in which the actuator plate 54 is restored, the pressure in the pressure chamber 61 increases, and thus, the ink in the pressure chamber 61 is ejected outside through the nozzle hole 71. By the ink ejected outside landing on the recording target medium P, print information is recorded on the recording target medium P.

<Method of Manufacturing Head Chip 50>

Figure 11:
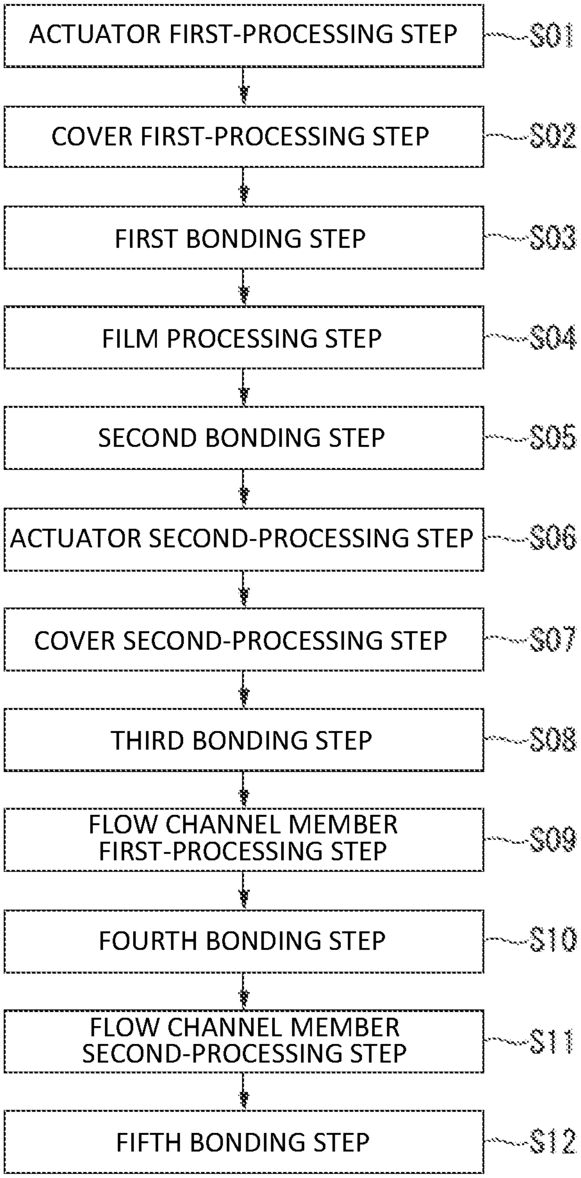
FIG. 11 is a flowchart for explaining a method of manufacturing the head chip according to the first embodiment.

Then, a method of manufacturing the head chip 50 described above will be described. FIG. 11 is a flowchart for explaining the method of manufacturing the head chip 50. FIG. 12 through FIG. 23 are each a diagram for explaining a step of the method of manufacturing the head chip 50, and are each a cross-sectional view corresponding to FIG. 4. In the following description, there is described when manufacturing the head chip 50 chip by chip as an example for the sake of convenience.

As shown in FIG. 11, the method of manufacturing the head chip 50 is provided with an actuator first-processing step S01, a cover first-processing step S02, a first bonding step S03, a film processing step S04, a second bonding step S05, an actuator second-processing step S06, a cover second-processing step S07, a third bonding step S08, a flow channel member first-processing step S09, a fourth bonding step S10, a flow channel member second-processing step S11, and a fifth bonding step S12.

Figure 12:
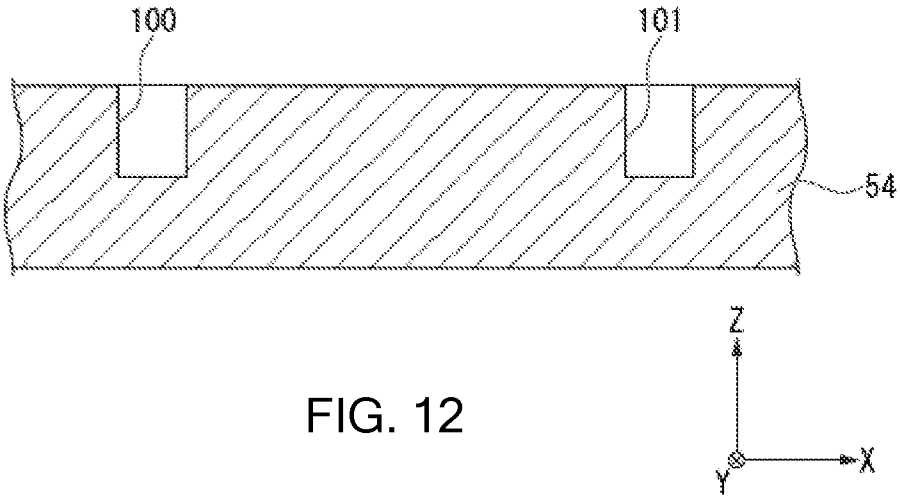
FIG. 12 is a diagram for explaining a step of the method of manufacturing the head chip according to the first embodiment, and is a cross-sectional view corresponding to FIG. 3.

As shown in FIG. 12, in the actuator first-processing step S01, first, recessed parts 100, 101 forming the common interconnecting first hole 91 and the individual interconnecting first hole 93 (a recessed part formation step). Specifically, a mask pattern in which formation areas of the common interconnecting first hole 91 and the individual interconnecting first hole 93 open is formed on the upper surface of the actuator plate 54. Subsequently, sandblasting and so on are performed on the upper surface of the actuator plate 54 through the mask pattern. Thus, the recessed parts 100, 101 recessed from the upper surface are provided to the actuator plate 54. It should be noted that the recessed parts 100, 101 can be formed by dicer processing, precision drill processing, etching processing, or the like.

Figure 13:
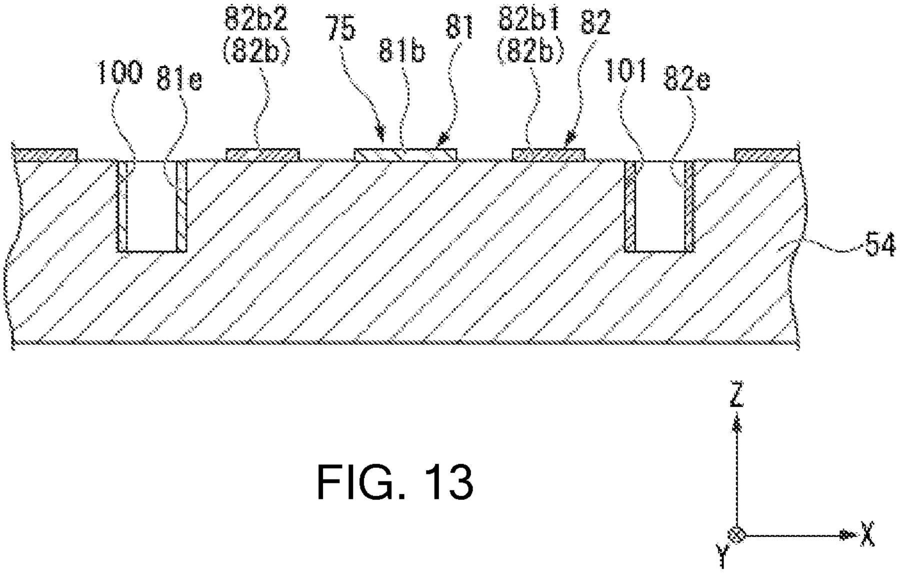
FIG. 13 is a diagram for explaining a step of the method of manufacturing the head chip according to the first embodiment, and is a cross-sectional view corresponding to FIG. 3.

Then, as shown in FIG. 13, in the actuator first-processing step S01, portions located on the upper surface of the actuator plate 54 out of the drive interconnections 75 are formed (an upper-surface interconnection formation step). In the upper-surface interconnection formation step, first, a mask pattern in which formation areas of the drive interconnections 75 open is formed on the upper surface of the actuator plate 54. Then, an electrode material is deposited on the actuator plate 54 using, for example, vapor deposition. The electrode material is deposited on the actuator plate 54 through the opening parts of the mask pattern. Thus, the drive interconnections 75 are formed on the upper surface of the actuator plate 54, and inner surfaces of the recessed parts 100, 101.

Figure 14:
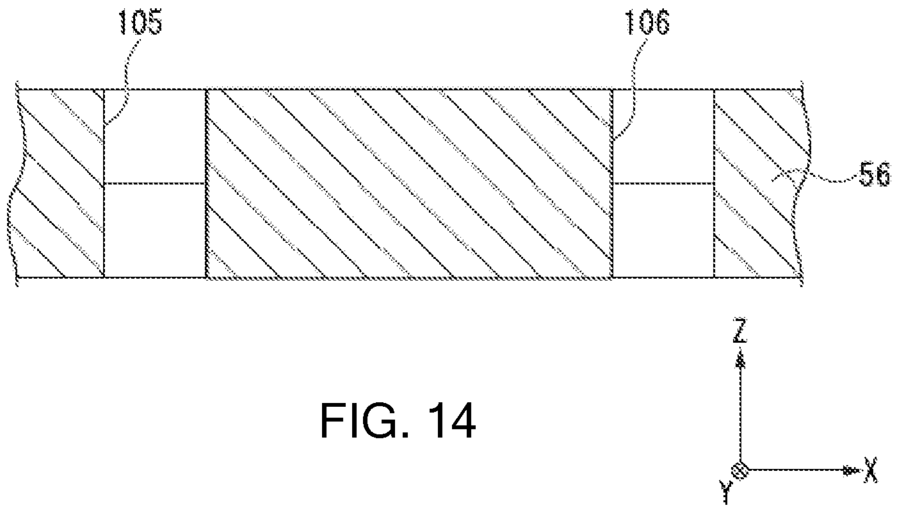
FIG. 14 is a diagram for explaining a step of the method of manufacturing the head chip according to the first embodiment, and is a cross-sectional view corresponding to FIG. 3.

As shown in FIG. 14, in the cover first-processing step S02, through holes 105, 106 forming a part of the common interconnecting second hole 92 and a part of the individual interconnecting second hole 94 are provided to the cover plate 56. The through holes 105, 106 can be formed by the sandblasting, the dicer processing, or the like similarly to the method of providing the recessed parts 100, 101 to the actuator plate 54.

Figure 15:
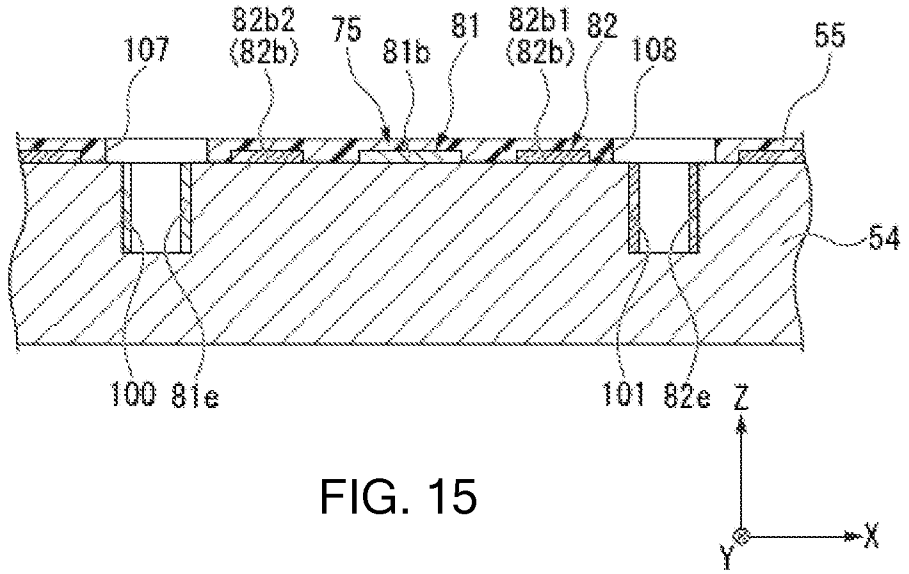
FIG. 15 is a diagram for explaining a step of the method of manufacturing the head chip according to the first embodiment, and is a cross-sectional view corresponding to FIG. 3.

As shown in FIG. 15, in the first bonding step S03, the second film 55 is attached to the upper surface of the actuator plate 54 with an adhesive or the like.

In the film processing step S04, through holes 107, 108 forming a part of the common interconnecting second hole 92 and a part of the individual interconnecting second hole 94. It is possible to form the through holes 107, 108 by performing, for example, laser processing on portions of the second film 55, the portions overlapping the corresponding recessed parts 100, 101 when viewed from the Z direction. Thus, the recessed parts 100 and the through holes 107 are communicated with each other, and the recessed parts 101 and the through holes 108 are communicated with each other.

Figure 16:
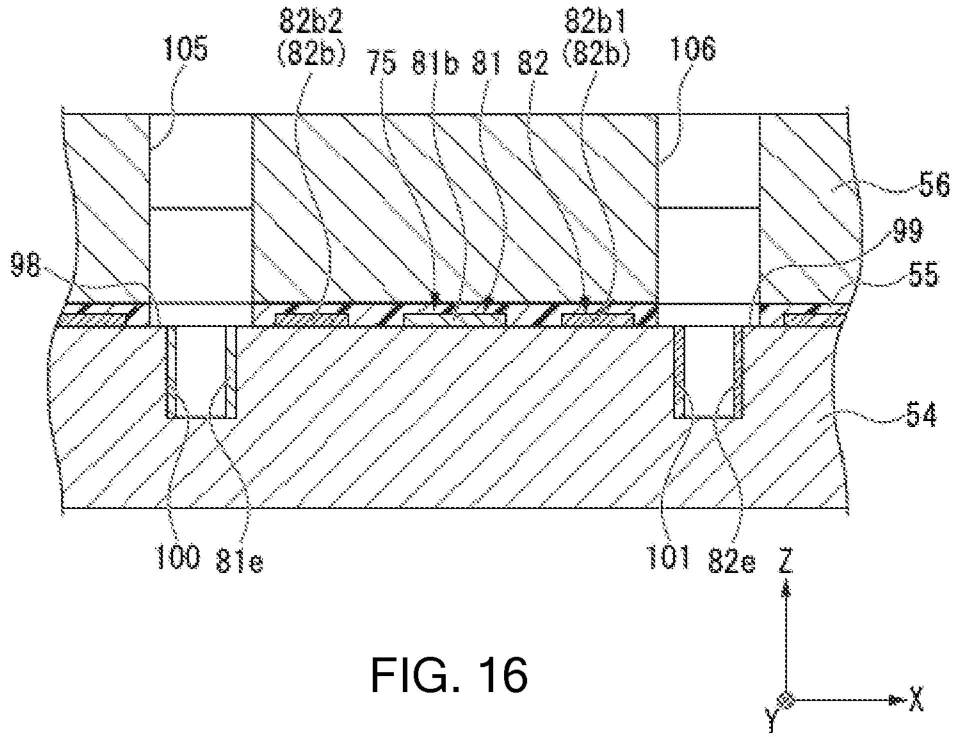
FIG. 16 is a diagram for explaining a step of the method of manufacturing the head chip according to the first embodiment, and is a cross-sectional view corresponding to FIG. 3.

As shown in FIG. 16, in the second bonding step S05, the cover plate 56 is attached to the upper surface of the second film 55 with an adhesive or the like.

Figure 17:
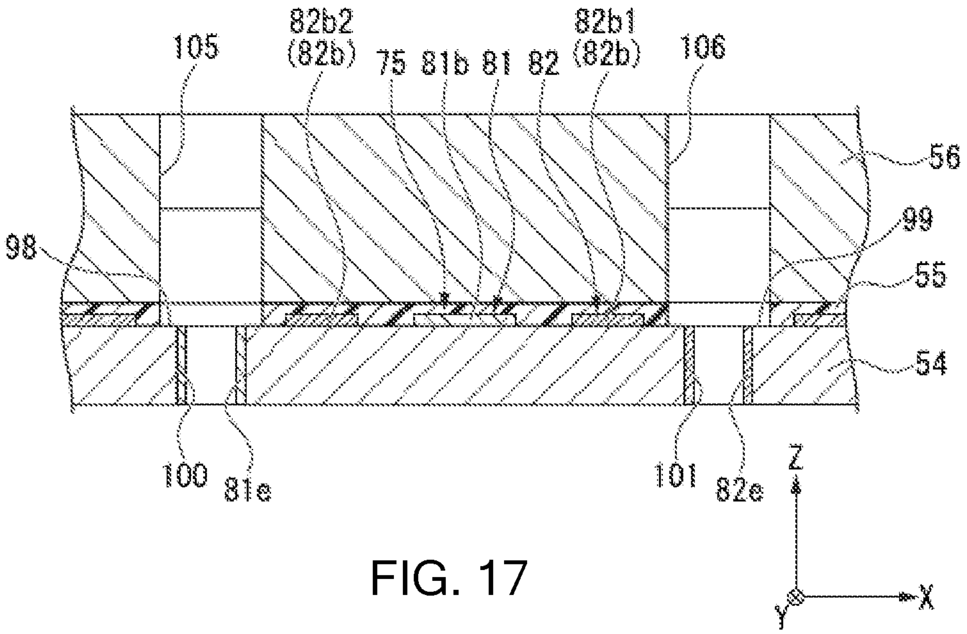
FIG. 17 is a diagram for explaining a step of the method of manufacturing the head chip according to the first embodiment, and is a cross-sectional view corresponding to FIG. 3.

As shown in FIG. 17, in the actuator second-processing step S06, grinding processing is performed on the lower surface of the actuator plate 54 (a grinding step). On this occasion, on the lower surface of the actuator plate 54, the actuator plate 54 is ground up to a position where the recessed parts 100, 101 open.

Figure 18:
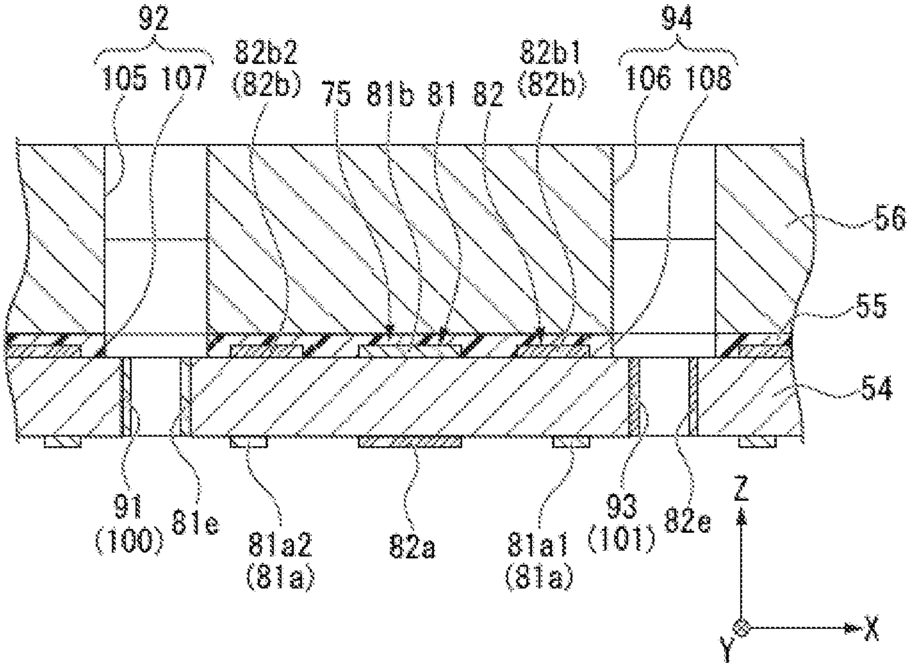
FIG. 18 is a diagram for explaining a step of the method of manufacturing the head chip according to the first embodiment, and is a cross-sectional view corresponding to FIG. 3.

Then, as shown in FIG. 18, in the actuator second-processing step S06, portions located on the lower surface of the actuator plate 54 out of the drive interconnections 75 are formed (a lower-surface interconnection formation step). In the lower-surface interconnection formation step, first, a mask pattern in which formation areas of the drive interconnections 75 open is formed on the lower surface of the actuator plate 54. Subsequently, an electrode material is deposited on the actuator plate 54 using, for example, vapor deposition. The electrode material is deposited on the actuator plate 54 through the opening parts of the mask pattern. Thus, the drive interconnections 75 are formed on the lower surface of the actuator plate 54, and inner surfaces of the interconnecting first holes 91, 93.

Figure 19:
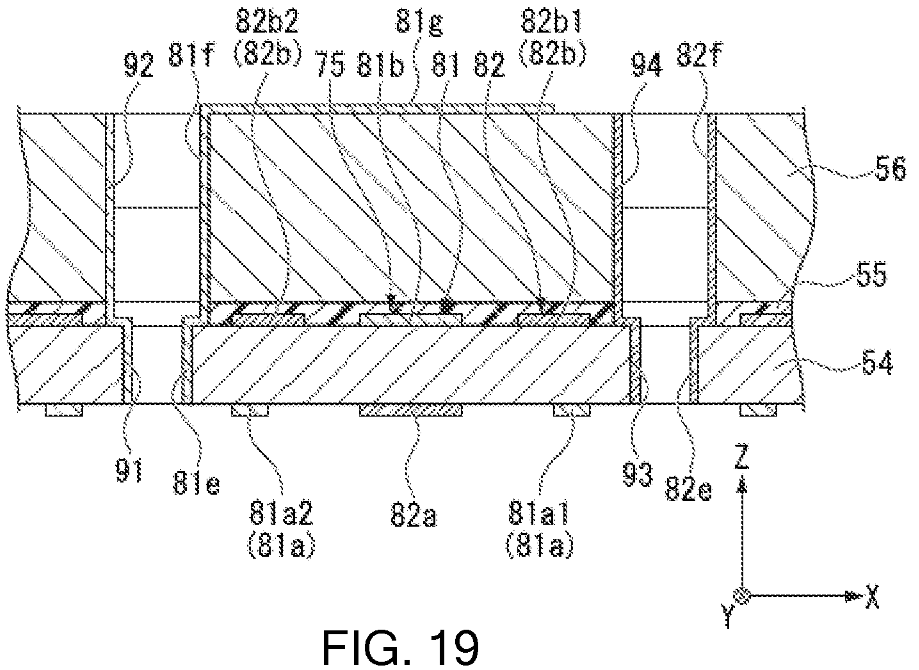
FIG. 19 is a diagram for explaining a step of the method of manufacturing the head chip according to the first embodiment, and is a cross-sectional view corresponding to FIG. 3.

As shown in FIG. 19, in the cover second-processing step S07, the second through interconnections 81*f*, 82*f* and the pads 81*g*, 82*g* are provided to the cover plate 56. Specifically, first, a mask pattern in which formation areas of the second through interconnections 81*f*, 82*f* and the pads 81*g*, 82*g* open is formed on the upper surface of the cover plate 56. Then, an electrode material is deposited on the cover plate 56 using, for example, vapor deposition. The electrode material is deposited on the cover plate 56 through the opening parts of the mask pattern. Thus, the second through interconnections 81*f*, 82*f* and the pads 81*g*, 82*g* are formed.

Then, in the cover second-processing step S07, the common separation grooves 96 are provided to the upper surface of the cover plate 56. Formation of the common separation grooves 96 is performed by making a dicer enter the actuator plate 54 from, for example, the upper surface side.

Figure 20:
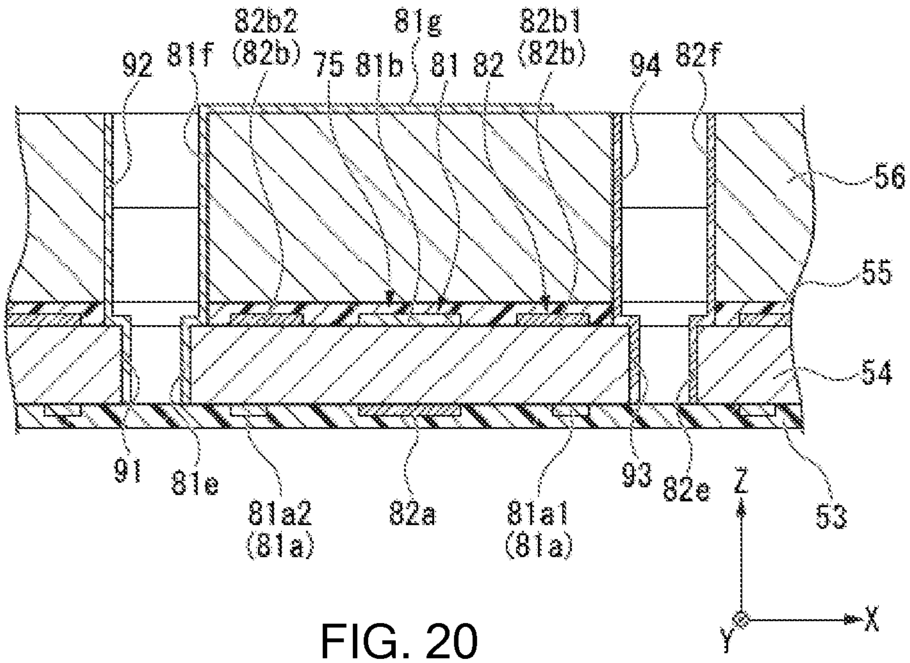
FIG. 20 is a diagram for explaining a step of the method of manufacturing the head chip according to the first embodiment, and is a cross-sectional view corresponding to FIG. 3.

As shown in FIG. 20, in the third bonding step S08, the first film 53 is attached to the lower surface of the actuator plate 54 with an adhesive or the like.

Figure 21:
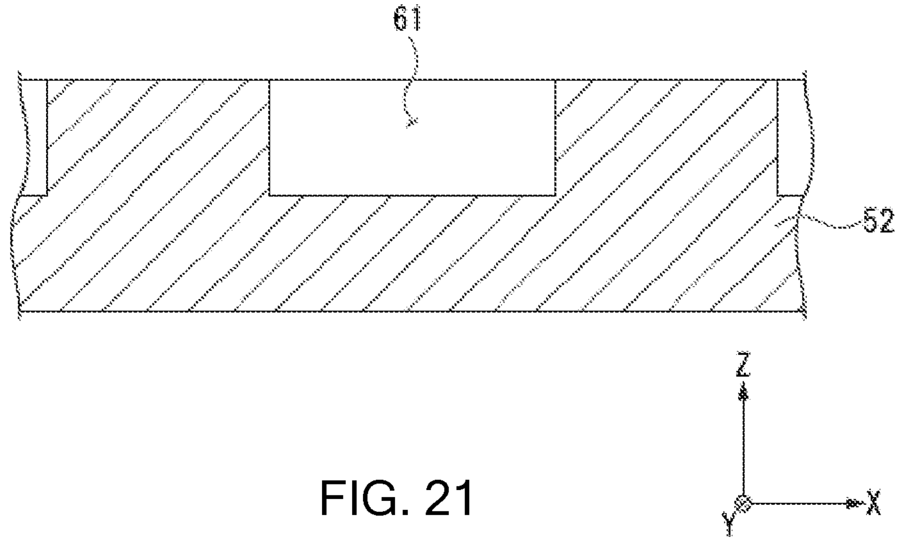
FIG. 21 is a diagram for explaining a step of the method of manufacturing the head chip according to the first embodiment, and is a cross-sectional view corresponding to FIG. 3.

As shown in FIG. 21, in the flow channel member first-processing step S09, the flow channels 60 (see FIG. 7) and the pressure chambers 61 are provided to the flow channel member 52. The flow channels 60 and the pressure chambers 61 are formed by performing, for example, sandblasting on the flow channel member 52.

Figure 22:
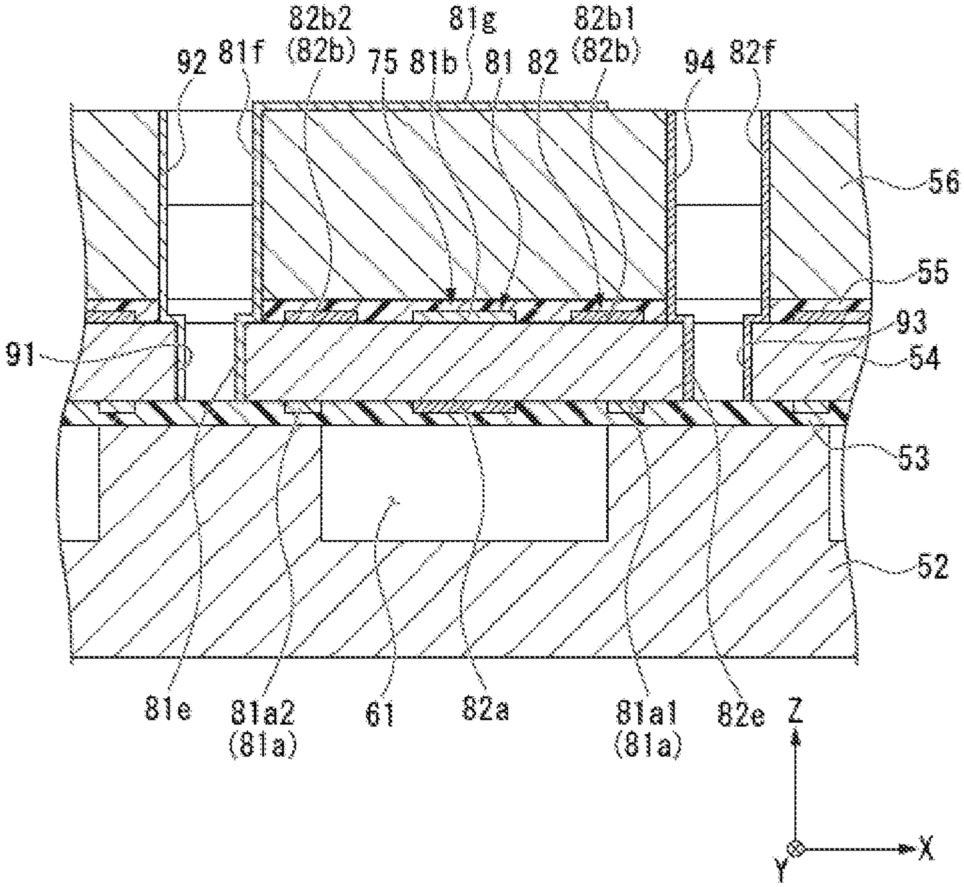
FIG. 22 is a diagram for explaining a step of the method of manufacturing the head chip according to the first embodiment, and is a cross-sectional view corresponding to FIG. 3.

As shown in FIG. 22, in the fourth bonding step S10, the flow channel member 52 is attached to the lower surface of the first film 53 with an adhesive or the like.

Figure 23:
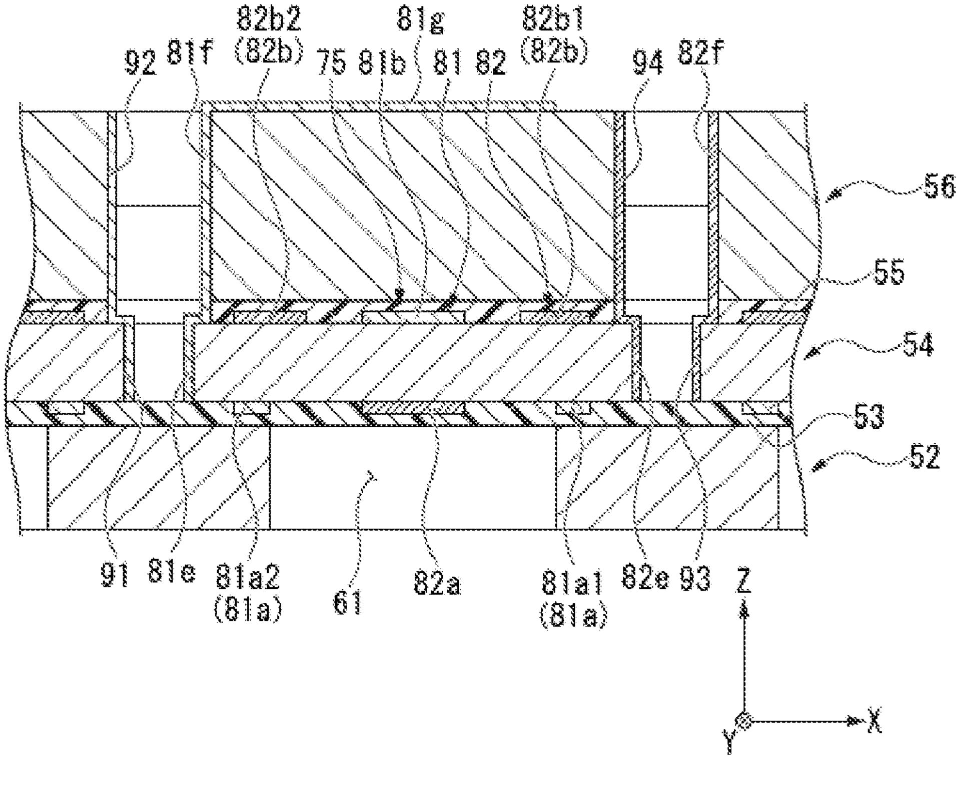
FIG. 23 is a diagram for explaining a step of the method of manufacturing the head chip according to the first embodiment, and is a cross-sectional view corresponding to FIG. 3.

As shown in FIG. 23, in the flow channel member second-processing step S11, grinding processing is performed on the lower surface of the flow channel member 52 (a grinding step). On this occasion, on the lower surface of the flow channel member 52, the flow channel member 52 is ground up to a position where the flow channels 60 and the pressure chambers 61 open.

In the fifth bonding step S12, the nozzle plate 51 is attached to the lower surface of the flow channel member 52 in a state in which the nozzle holes 71 and the pressure chambers 61 are aligned with each other.

Due to the steps described hereinabove, the head chip 50 is completed.

Here, in the first embodiment, there is adopted the configuration in which the interconnecting first holes (dividing grooves) 91, 93 for zoning the actuator plate 54 between the pressure chambers 61 adjacent to each other are provided to the portion of the actuator plate 54, the portion being located between the pressure chambers 61 adjacent to each other when viewed from the Z direction (a first direction).

According to this configuration, it is possible to inhibit the deformation of the portion of the actuator plate 54 corresponding to one of the pressure chambers 61 from reaching to the portion corresponding to another of the pressure chambers adjacent to the one of the pressure chambers 61. As a result, it is possible to prevent the deterioration of the ejection performance due to the occurrence of the mechanical crosstalk.

In the head chip 50 according to the first embodiment, there is adopted the configuration in which the interconnecting first holes 91, 93 open on the lower surface (a first surface) of the actuator plate 54, the first film (an insulating sheet) 53 is attached to the lower surface of the actuator plate 54 so as to cover the drive interconnections 75 and the interconnecting first holes 91, 93, and the actuator plate 54 is disposed on the flow channel member 52 via the first film 53 so as to close the upper-end opening part of each of the pressure chambers 61.

According to this configuration, since it is possible to inhibit the drive interconnections 75 from making contact with the ink using the first film 53, it is possible to inhibit short circuit, corrosion, and so on of the drive interconnections 75. Further, by the first film 53 being disposed so as to cover the interconnecting first holes 91, 93, bubbles confined between the first film 53 and the actuator plate 54 when attaching the first film 53 to the actuator plate 54 can be discharged to an inside of the first film 53. Thus, it is possible to enhance adhesiveness between the actuator plate 54 and the first film 53. As a result, the ink is inhibited from entering an area between the actuator plate 54 and the first film 53, and thus, it becomes easy to inhibit the short circuit, the corrosion, and so on of the drive interconnections 75.

In the head chip 50 according to the first embodiment, there is adopted the configuration in which the through interconnections 81*e*, 82*e* for patterning the electrodes 81*a*, 82*a* toward the upper surface (a second surface) of the actuator plate 54 are formed in the interconnecting first holes (through holes) 91, 93.

According to this configuration, by patterning the electrodes 81*a*, 82*a* to the upper surface side of the actuator plate 54 via the through interconnections 81*e*, 82*e*, it becomes easy to ensure the mounting area of the flexible printed board (the external wiring) 97. Thus, it is possible to increase a degree of design freedom.

Moreover, in the first embodiment, by providing the interconnecting first holes 91, 93 to the portion located between the pressure chambers 61 adjacent to each other, it is possible to provide the interconnecting first holes 91, 93 with the function as the dividing groove and the through hole. Thus, it is possible to achieve the reduction in size of the head chip 50 compared to when forming the dividing groove and the through hole separately from each other.

Since the inkjet head 5 and the printer 1 according to the first embodiment are each provided with the head chip 50 described above, it is possible to provide the inkjet head 5 and the printer 1 which are high in quality and capable of exerting the desired ejection performance.

Second Embodiment

Figure 24:
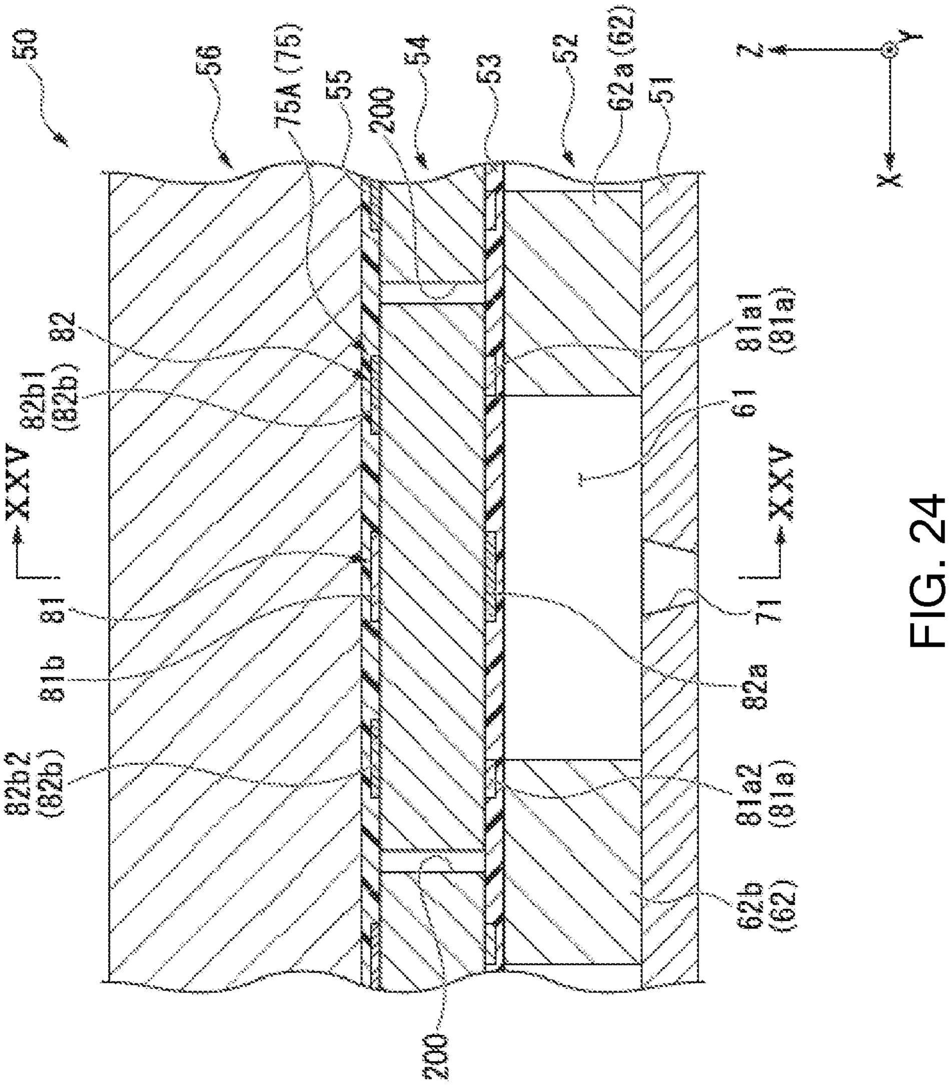
FIG. 24 is a cross-sectional view of the head chip corresponding to the line XXIV-XXIV shown in FIG. 25.
Figure 25:
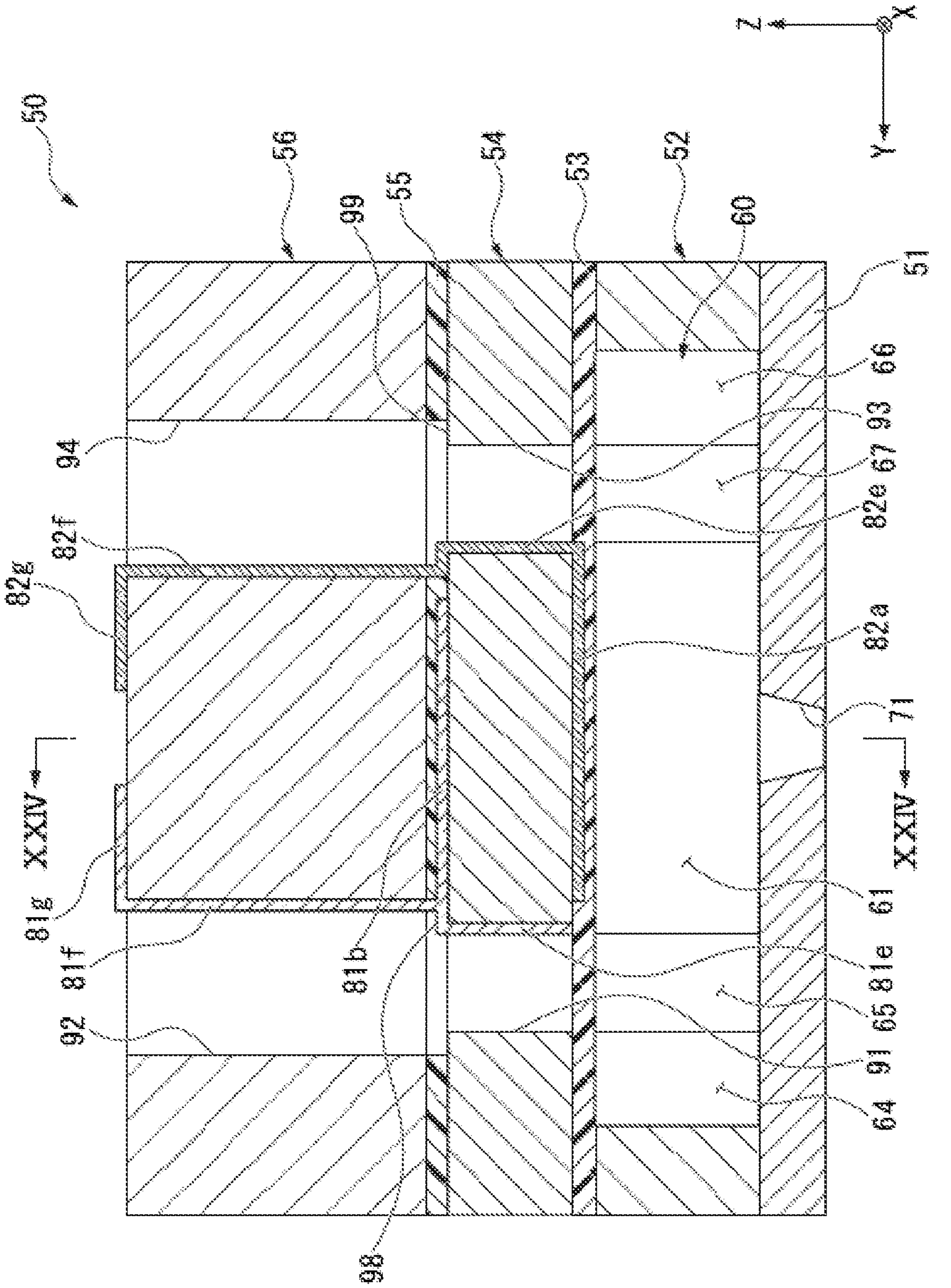
FIG. 25 is a cross-sectional view of the head chip corresponding to the line XXV-XXV shown in FIG. 24.
Figure 26:
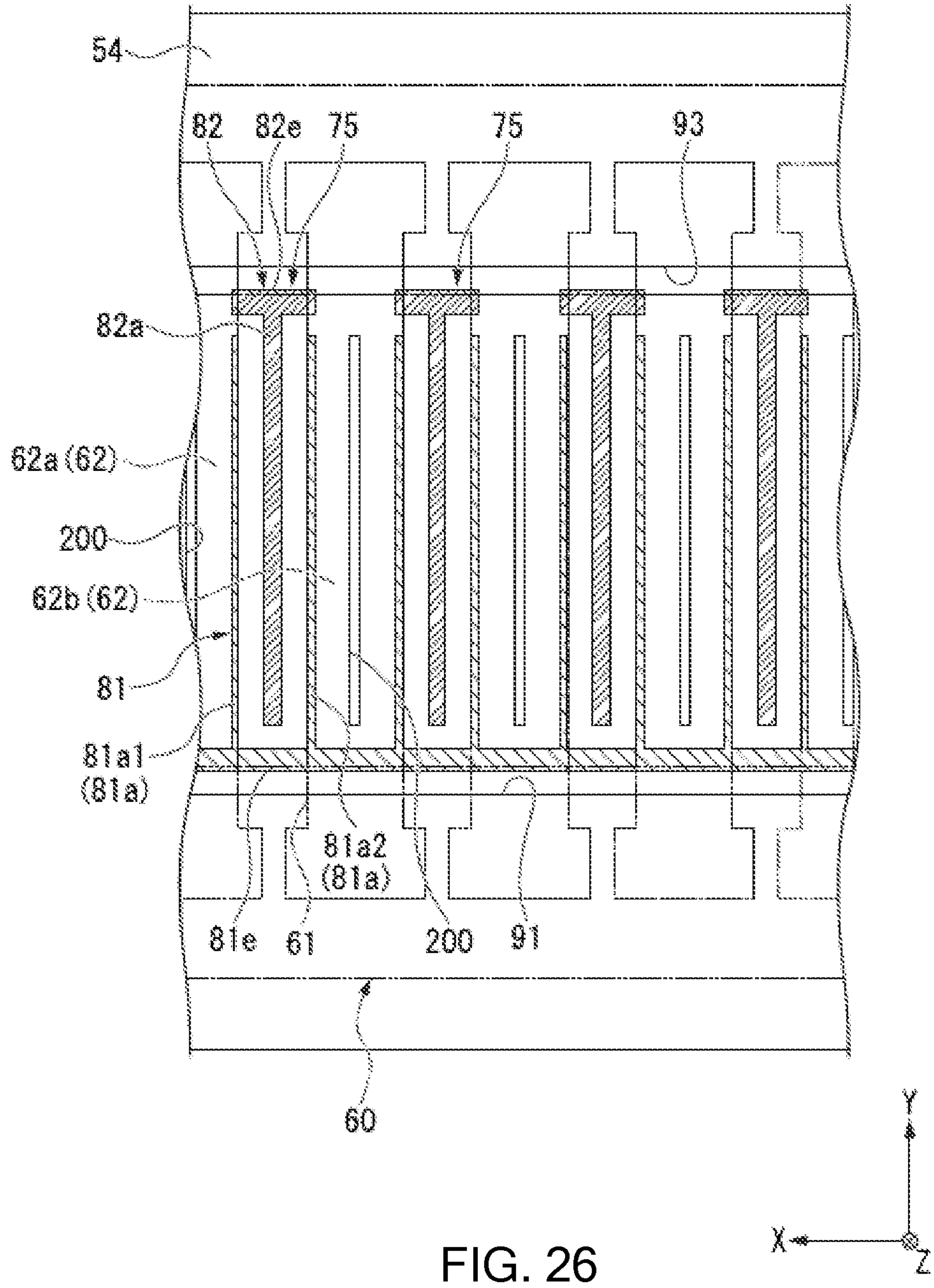
FIG. 26 is a bottom view of an actuator plate related to a second embodiment.
Figure 27:
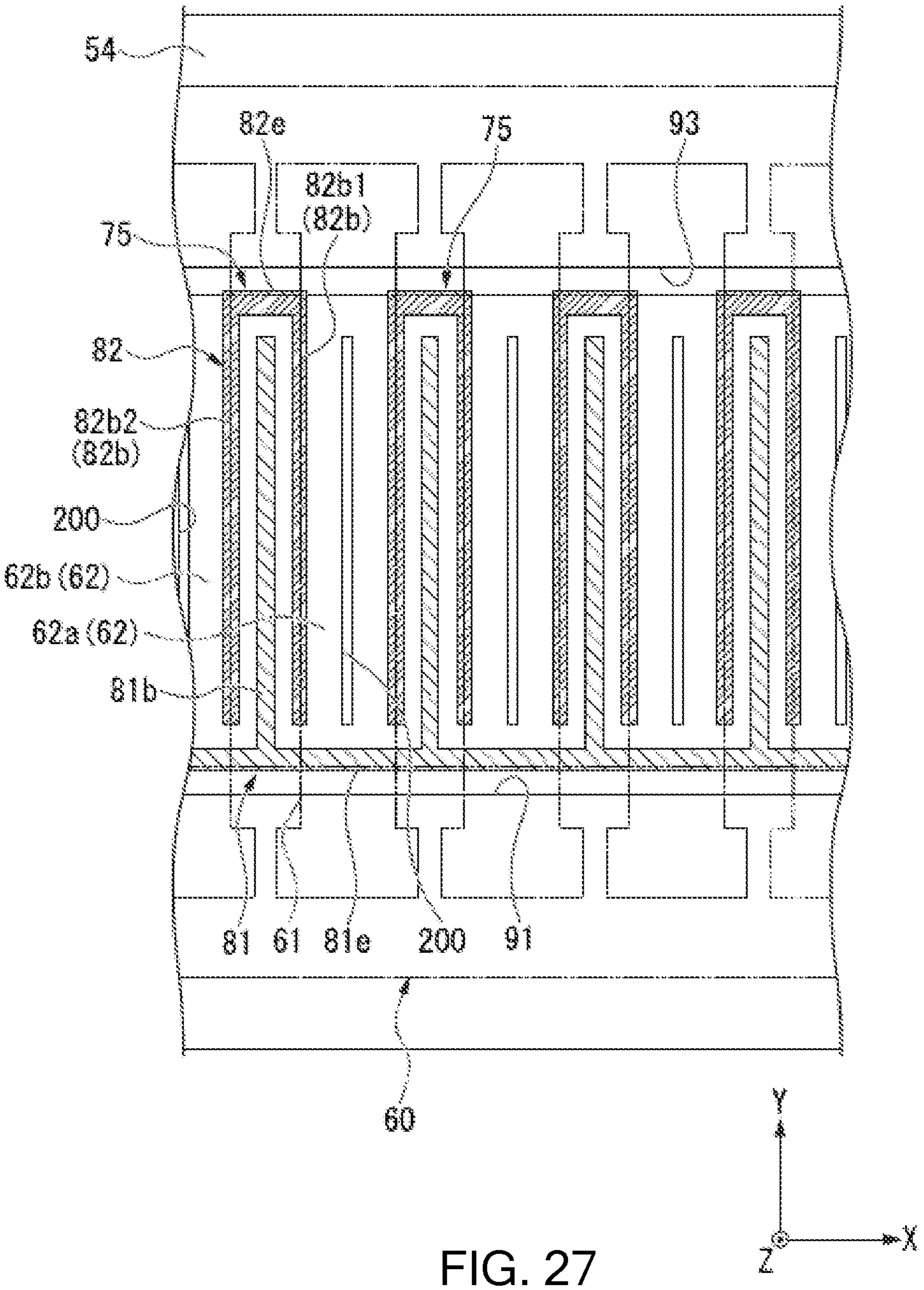
FIG. 27 is a plan view of the actuator plate related to the second embodiment.
Figure 28:
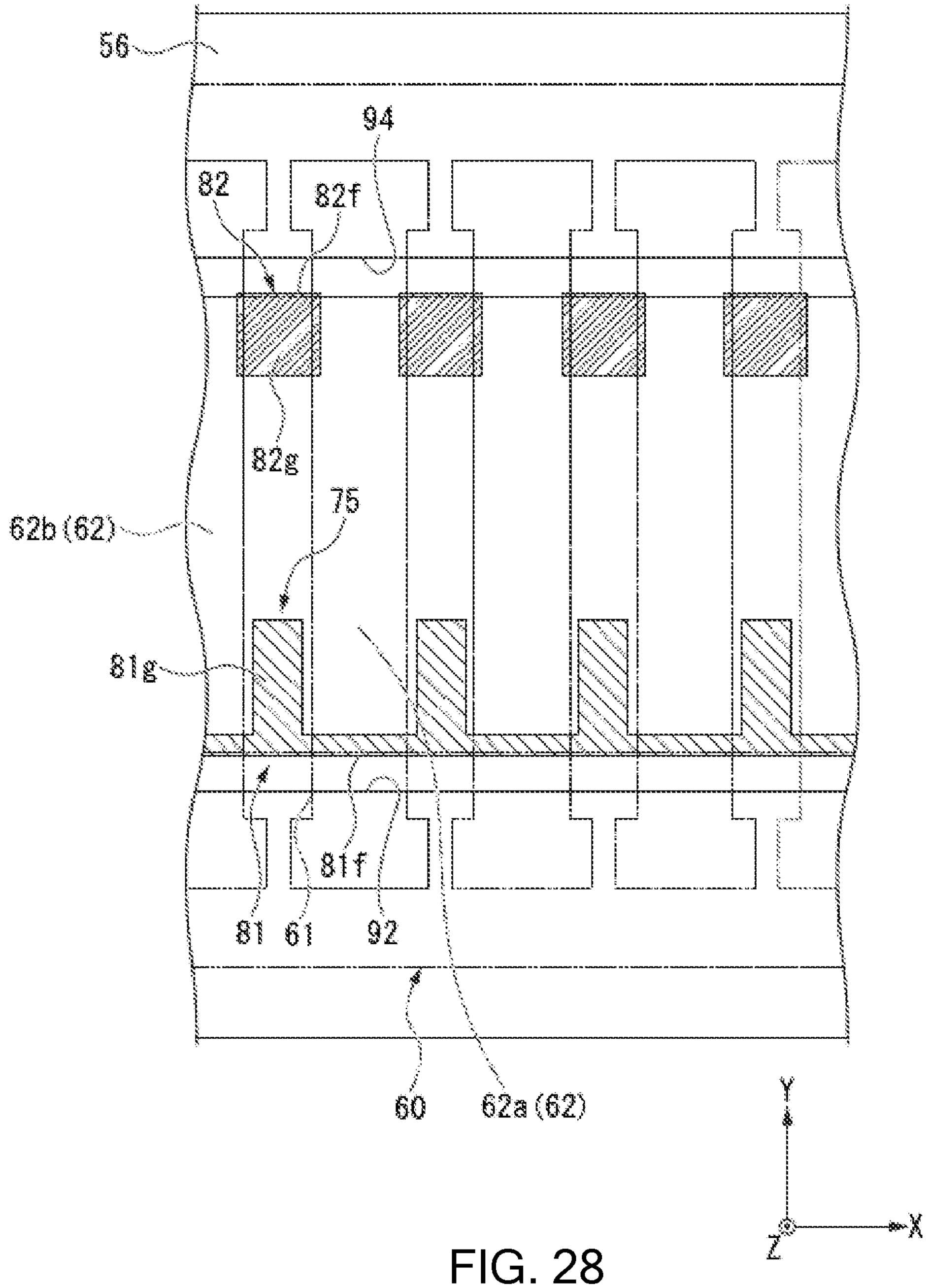
FIG. 28 is a plan view of a cover plate related to the second embodiment.

FIG. 24 is a cross-sectional view of the head chip 50 corresponding to the line XXIV-XXIV shown in FIG. 25. FIG. 25 is a cross-sectional view of the head chip 50 corresponding to the line XXV-XXV shown in FIG. 24. FIG. 26 is a bottom view of the actuator plate 54. FIG. 27 is a plan view of the actuator plate 54. FIG. 28 is a plan view of the cover plate 56. The second embodiment is different from the embodiment described above in the point that the dividing groove and the through hole are provided separately from each other.

In the head chip 50 shown in FIG. 24 through FIG. 28, the common interconnection 81 is provided with the first common electrodes 81*a*, the second common electrode 81*b*, the first through interconnection 81*e*, the second through interconnection 81*f*, and the common pad 81*g*.

The first common electrodes 81*a* and the second common electrode 81*b* are disposed for each of the pressure chambers 61 similarly to the first embodiment described above.

As shown in FIG. 25 through FIG. 27, the first through interconnection 81*e* is formed on the inner surface of the common interconnecting first hole 91. The common interconnecting first hole 91 penetrates a portion of the actuator plate 54, the portion being located at the −Y side with respect to the pressure chamber 61, and overlapping the entrance-side common flow channel 64 or the entrance-side communication channels 65 when viewed from the Z direction. The common interconnecting first hole 91 extends in the X direction so as to traverse the plurality of pressure chambers 61.

The first through interconnection 81*e* is formed at least throughout the entire area in the Z direction on the inner surface of the common interconnecting first hole 91. In the illustrative example, the first through interconnection 81*e* is formed so as to traverse the plurality of pressure chambers 61 on a surface facing to the −Y side out of the inner surfaces of the common interconnecting first hole 91. The first through interconnection 81*e* is coupled to the −Y-side end portion of the first common electrodes 81*a* on the lower-end opening edge of the common interconnecting first hole 91 on the one hand, and is coupled to the −Y-side end portion of the second common electrode 81*b* on the upper-end opening edge of the common interconnecting first hole 91 on the other hand. In other words, the common interconnections 81 corresponding to the pressure chambers 61 are commonalized by the first through interconnection 81*e* in the common interconnecting first hole 91. It should be noted that the first through interconnection 81*e* can be formed throughout the entire circumference in the inner surface of the common interconnecting first hole 91.

As shown in FIG. 25 and FIG. 28, the second through interconnection 81*f* is formed on the inner surface of the common interconnecting second hole 92. The common interconnecting second hole 92 penetrates the second film 55 and the cover plate 56 in the Z direction at the position overlapping the common interconnecting first hole 91 when viewed from the Z direction. The common interconnecting second hole 92 is made one-size larger than the outer shape of the common interconnecting first hole 91 when viewed from the Z direction.

The second through interconnection 81*f* is formed on the inner surface of the common interconnecting second hole 92. The second through interconnection 81*f* is formed at least throughout the entire area in the Z direction on the inner surface of the common interconnecting second hole 92. In the illustrative example, the second through interconnection 81*f* is formed so as to traverse the plurality of pressure chambers 61 on a surface facing to the −Y side out of the inner surfaces of the common interconnecting second hole 92. The second through interconnection 81*f* is coupled to the first through interconnection 81*e* on the lower-end opening edge of the common interconnecting second hole 92.

The common pad 81*g* is disposed on the upper surface of the cover plate 56 so as to correspond to each of the pressure chambers 61. Each of the common pads 81*g* extends from the upper-end opening edge of the common interconnecting second hole 92 toward the +Y side on the upper surface of the cover plate 56. At least a part of the common pad 81*g* overlaps the pressure chamber 61 when viewed from the Z direction.

As shown in FIG. 25 through FIG. 27, the individual interconnection 82 is provided with the first individual electrode 82*a*, the second individual electrodes 82*b*, the first through interconnection 82*e*, the second through interconnection 82*f*, and the individual pad 82*g*.

The first individual electrode 82*a* and the second individual electrodes 82*b* are disposed for each of the pressure chambers 61 similarly to the first embodiment described above.

The first through interconnection 82*e* is formed on the inner surface of the individual interconnecting first hole 93. The individual interconnecting first hole 93 penetrates a portion of the actuator plate 54, the portion being located at the +Y side with respect to the pressure chamber 61, and overlapping the exit-side common flow channel 66 or the exit-side communication channels 67 when viewed from the Z direction. The individual interconnecting first hole 93 extends in the X direction so as to traverse the plurality of pressure chambers 61.

The first through interconnection 82*e* is formed at least throughout the entire area in the Z direction on the inner surface of the individual interconnecting first hole 93. In the illustrative example, the first through interconnection 82*e* is formed on a surface facing to the +Y side out of the inner surfaces of the individual interconnecting first hole 93. The first through interconnection 82*e* is coupled to the +Y-side end portion of the corresponding first individual electrode 82*a* on the lower-end opening edge of the individual interconnecting first hole 93 on the one hand, and is coupled to the +Y-side end portion of the corresponding second individual electrode 82*b* on the upper-end opening edge of the individual interconnecting first hole 93 on the other hand. The first through interconnections 81*e* corresponding to the pressure chambers 61 are separated from each other inside the individual interconnecting first hole 93.

As shown in FIG. 25 and FIG. 28, the second through interconnection 82*f* is formed on the inner surface of the individual interconnecting second hole 94. The individual interconnecting second hole 94 penetrates the second film 55 and the cover plate 56 in the Z direction at the position overlapping the individual interconnecting first hole 93 when viewed from the Z direction. The individual interconnecting second hole 94 is made one-size larger than the outer shape of the individual interconnecting first hole 93 when viewed from the Z direction.

The second through interconnection 82*f* is formed on the inner surface of the individual interconnecting second hole 94. The second through interconnection 82*f* is formed at least throughout the entire area in the Z direction on the inner surface of the individual interconnecting second hole 94. In the illustrative example, the second through interconnection 82*f* is formed on a surface facing to the +Y side out of the inner surfaces of the individual interconnecting second hole 94. The second through interconnection 82*f* is coupled to the corresponding first through interconnection 82*e* on the lower-end opening edge of the individual interconnecting second hole 94.

The individual pad 82*g* is disposed on the upper surface of the cover plate 56 so as to correspond to each of the pressure chambers 61. Each of the individual pads 82*g* extends from the upper-end opening edge of the individual interconnecting second hole 94 toward the −Y side on the upper surface of the cover plate 56. At least a part of the individual pad 82*g* overlaps the pressure chamber 61 when viewed from the Z direction.

A dividing groove 200 is formed in a portion of the actuator plate 54, the portion overlapping the central portion in the X direction in the partition wall 62*b* when viewed from the Z direction. The dividing groove 200 penetrates the actuator plate 54 in the Z direction, and at the same time, continuously extends in the Y direction. The dividing groove 200 linearly extends in the Y direction along the pressure chamber 61. It should be noted that it is sufficient for the dividing groove 200 to open on at least one surface of the actuator plate 54. Further, the dividing grooves 200 can be formed at a distance in the Y direction.

The width in the X direction in the dividing groove 200 is made shorter compared to the width in the Y direction in the interconnecting first holes 91, 93. In other words, the groove width (the width of the dividing groove 200) for inhibiting the mechanical crosstalk can be narrower than the groove width (the width of the interconnecting first holes 91, 93) for allowing the interconnections to pass through. In the illustrative example, both end portions in the Y direction in the dividing groove 200 are terminated at positions separated from the interconnecting first holes 91, 93. It should be noted that the dividing groove 200 can be coupled to at least one of the interconnecting first holes 91, 93.

In the second embodiment, by separately disposing the interconnecting first holes 91, 93 and the dividing groove 200, it is possible to achieve an increase in degree of design freedom such as providing the interconnecting first holes 91, 93 and the dividing groove 200 with shapes suitable for the respective functions.

For example, in the second embodiment, there is adopted the configuration in which the interconnecting first holes 91, 93 are disposed at the outer side in the Y direction (a third direction) with respect to the pressure chamber 61.

According to this configuration, since it is sufficient for the dividing groove 200 to ensure the width with which the mechanical crosstalk can be inhibited, by disposing the interconnecting first holes 91, 93 at the outer side in the Y direction with respect to the pressure chamber 61, it is possible to reduce the distance between the pressure chambers 61 adjacent in the X direction to each other. As a result, it is possible to achieve the reduction in size in the X direction of the head chip 50 and reduction in pitch of the nozzle holes 71. Further, when curving out the head chip 50 from a single wafer, it is possible to increase the number of the head chips 50 taken per wafer. As a result, it is possible to achieve the cost reduction.

In contrast, by narrowing the width of the dividing groove 200, it becomes easy to ensure the widths of the electrodes 81*a*, 81*b*, 82*a*, and 82*b*. Therefore, it is possible to effectively apply the voltages to the electrodes 81*a*, 81*b*, 82*a*, and 82*b*, and thus, it is possible to achieve an increase in pressure to be generated.

Moreover, in the second embodiment, when ejecting the ink from only either one of the pressure chambers 61 adjacent to each other, it is possible to inhibit the potential difference from occurring between the individual electrode 82*b*1 in the portion of the actuator plate 54, the portion corresponding to the one of the pressure chambers 61, and the individual electrode 82*b*2 in the portion corresponding to the other of the pressure chambers 61 using the dividing groove 200. Therefore, it is possible to inhibit the normal drive of the actuator plate 54 from being hindered by the individual electrodes to which no voltage is applied.

Third Embodiment

Figure 29:
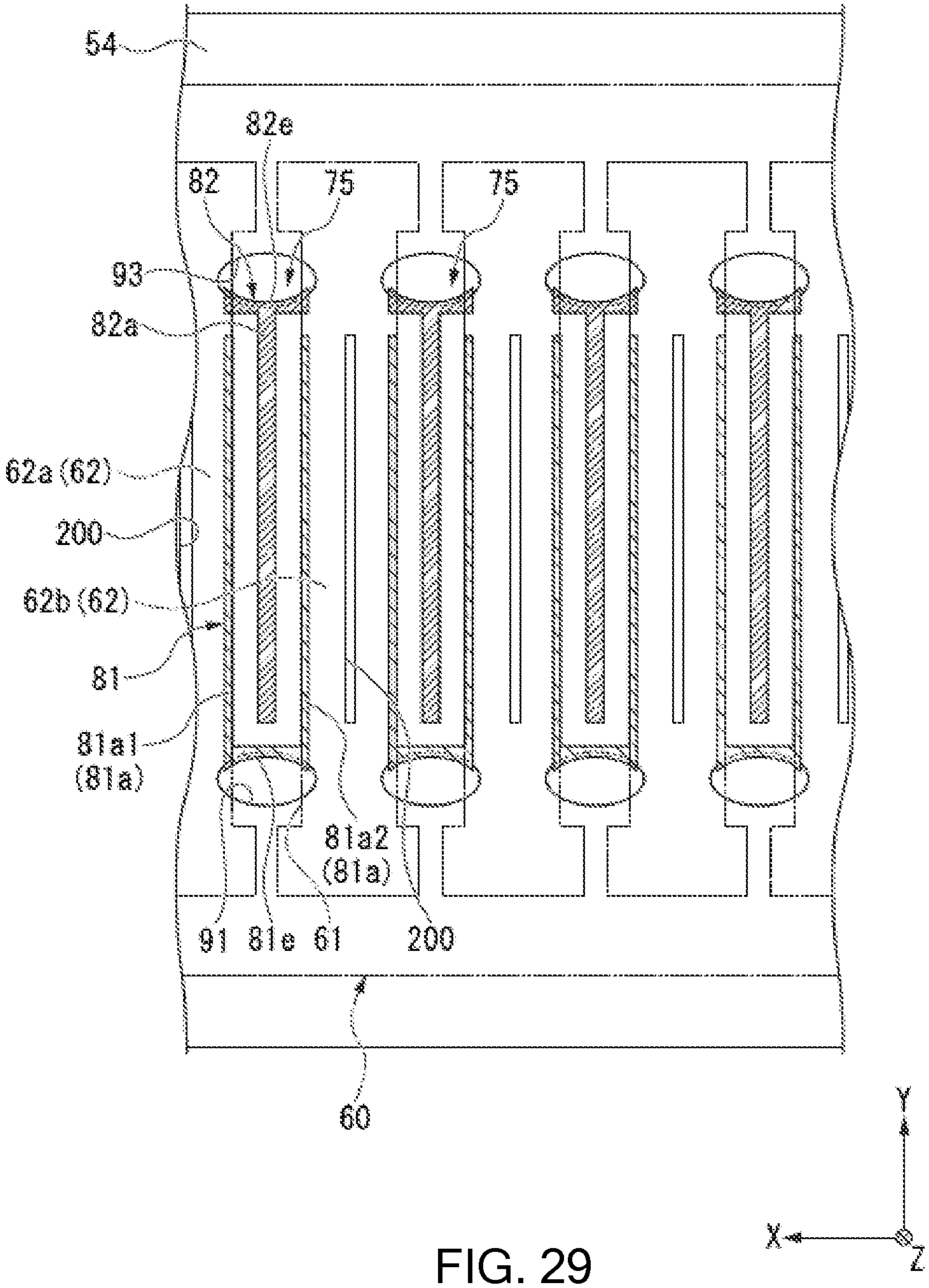
FIG. 29 is a bottom view of an actuator plate related to a third embodiment.
Figure 30:
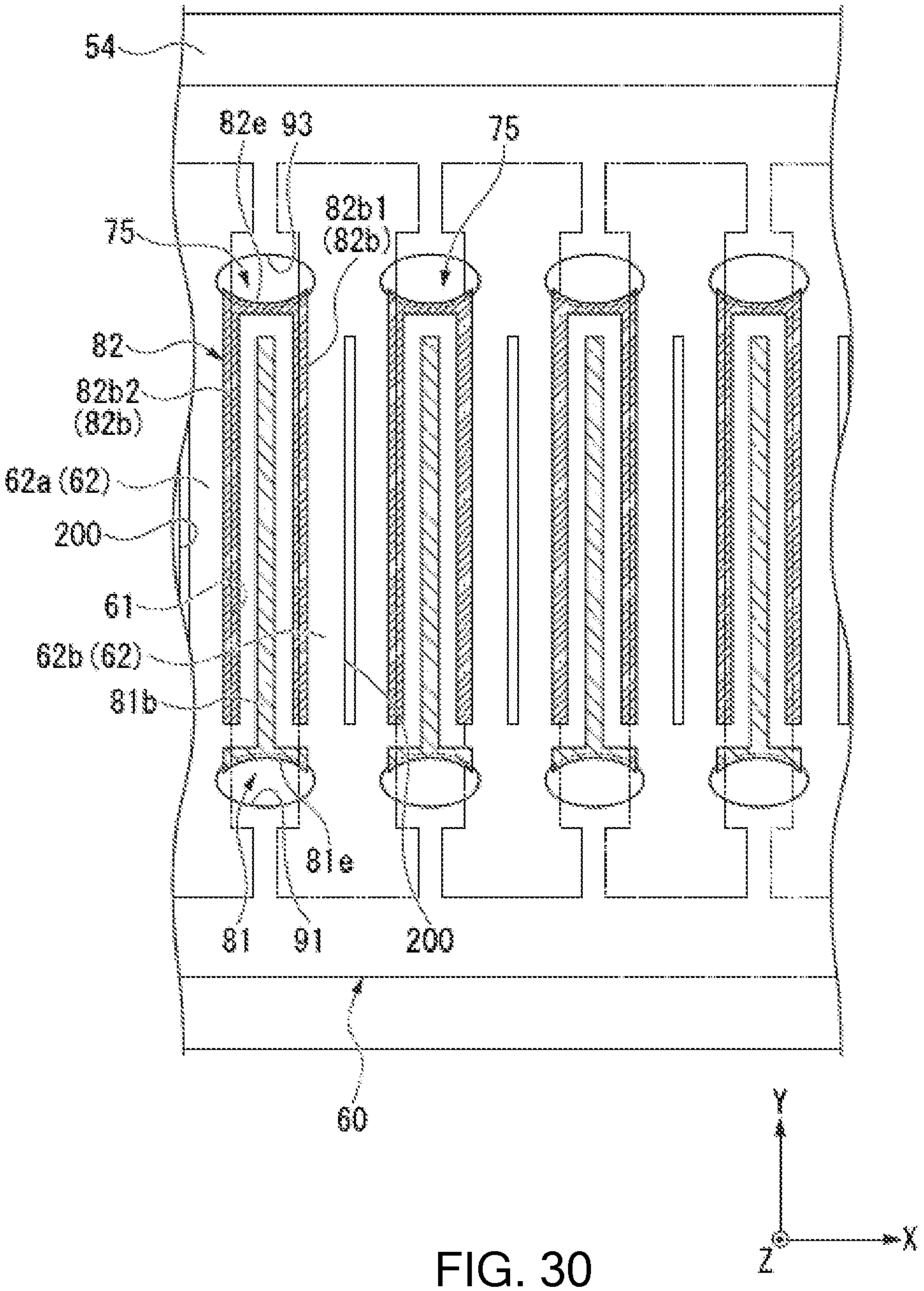
FIG. 30 is a plan view of the actuator plate related to the third embodiment.
Figure 31:
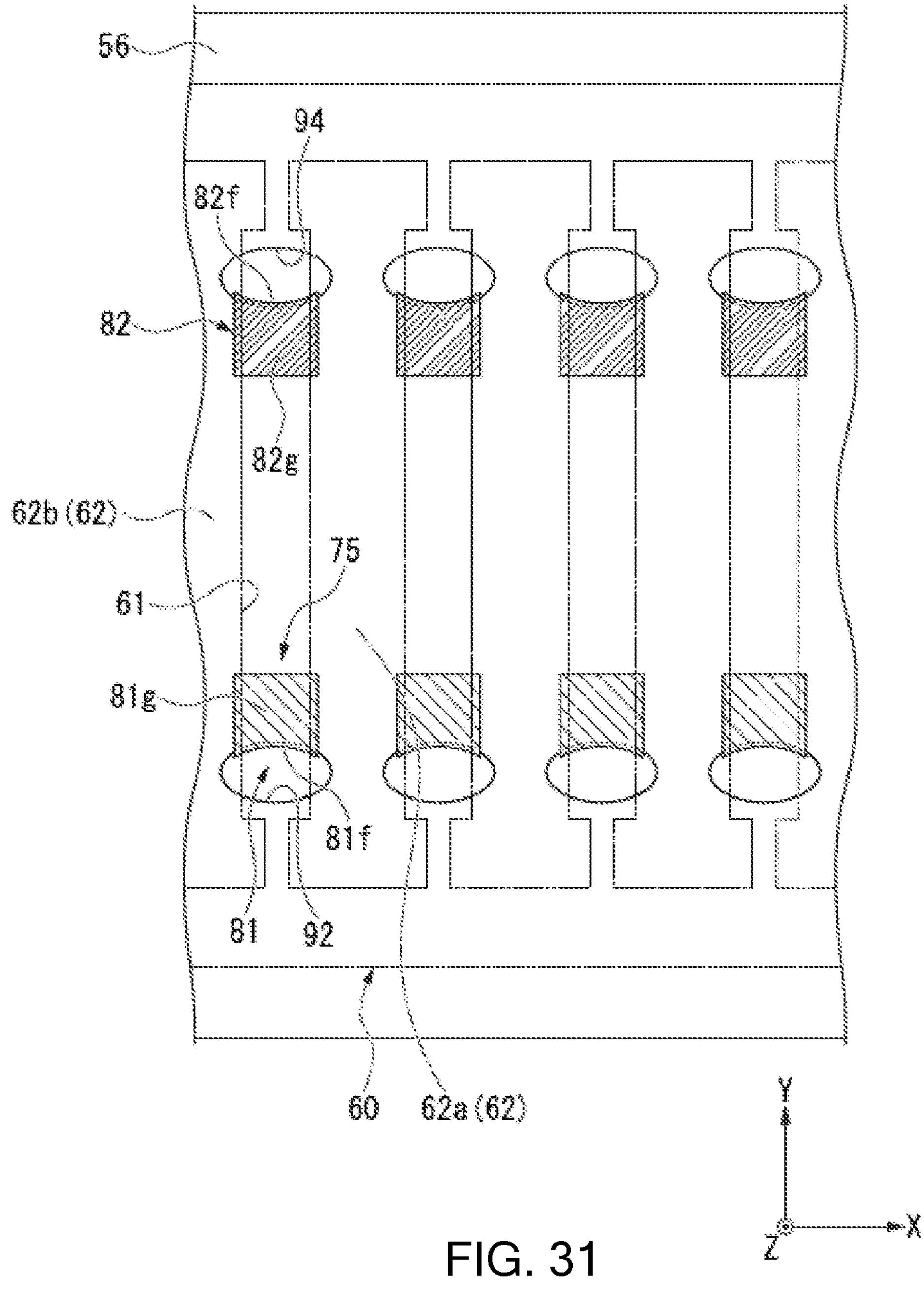
FIG. 31 is a plan view of a cover plate related to the third embodiment.

FIG. 29 is a bottom view of the actuator plate 54. FIG. 30 is a plan view of the actuator plate 54. FIG. 31 is a plan view of the cover plate 56. The third embodiment is different from the embodiments described above in the point that the interconnecting first holes 91, 93 and the interconnecting second holes 92, 94 are disposed individually for each of the pressure chambers 61.

As shown in FIG. 29 and FIG. 30, the common interconnecting first holes 91 are respectively formed in portions of the actuator plate 54, the portions being located at the −Y side with respect to the pressure chambers 61. The first through interconnection 81*e* is formed on the inner surface of the common interconnecting first hole 91.

As shown in FIG. 31, the common interconnecting second hole 92 penetrates the second film 55 and the cover plate 56 in the Z direction at the position overlapping the common interconnecting first hole 91 when viewed from the Z direction. The common interconnecting second hole 92 is made one-size larger than the outer shape of the common interconnecting first hole 91 when viewed from the Z direction. The second through interconnection 81*f* is formed on the inner surface of the common interconnecting second hole 92. The second through interconnection 81*f* is coupled to the common pad 81*g* on the upper-end opening edge of the common interconnecting second hole 92.

As shown in FIG. 29 and FIG. 30, the individual interconnecting first holes 93 are respectively formed in portions of the actuator plate 54, the portions being located at the +Y side with respect to the pressure chambers 61. The first through interconnection 82*e* is formed on the inner surface of the individual interconnecting first hole 93.

As shown in FIG. 31, the individual interconnecting second hole 94 penetrates the second film 55 and the cover plate 56 in the Z direction at the position overlapping the individual interconnecting first hole 93 when viewed from the Z direction. The individual interconnecting second hole 94 is made one-size larger than the outer shape of the individual interconnecting first hole 93 when viewed from the Z direction. The second through interconnection 82*f* is formed on the inner surface of the individual interconnecting second hole 94. The second through interconnection 82*f* is coupled to the individual pad 82*g* on the upper-end opening edge of the individual interconnecting second hole 94.

In the head chip 50 according to the third embodiment, there is adopted the configuration in which the interconnecting first holes 91, 93 are disposed for each of the pressure chambers 61.

According to this configuration, since the interconnecting first holes 91, 93 are disposed for each of the pressure chambers 61, it is possible to provide the through interconnection corresponding to the single pressure chamber 61 to the inside of each of the interconnecting first holes 91, 93. In this case, since it is possible to prevent the individual interconnections 82 corresponding to the pressure chambers 61 adjacent to each other from being coupled to each other inside the individual interconnecting first hole 93, patterning of the interconnections becomes easy, and thus it is possible to achieve an increase in manufacturing efficiency.

Fourth Embodiment

Figure 32:
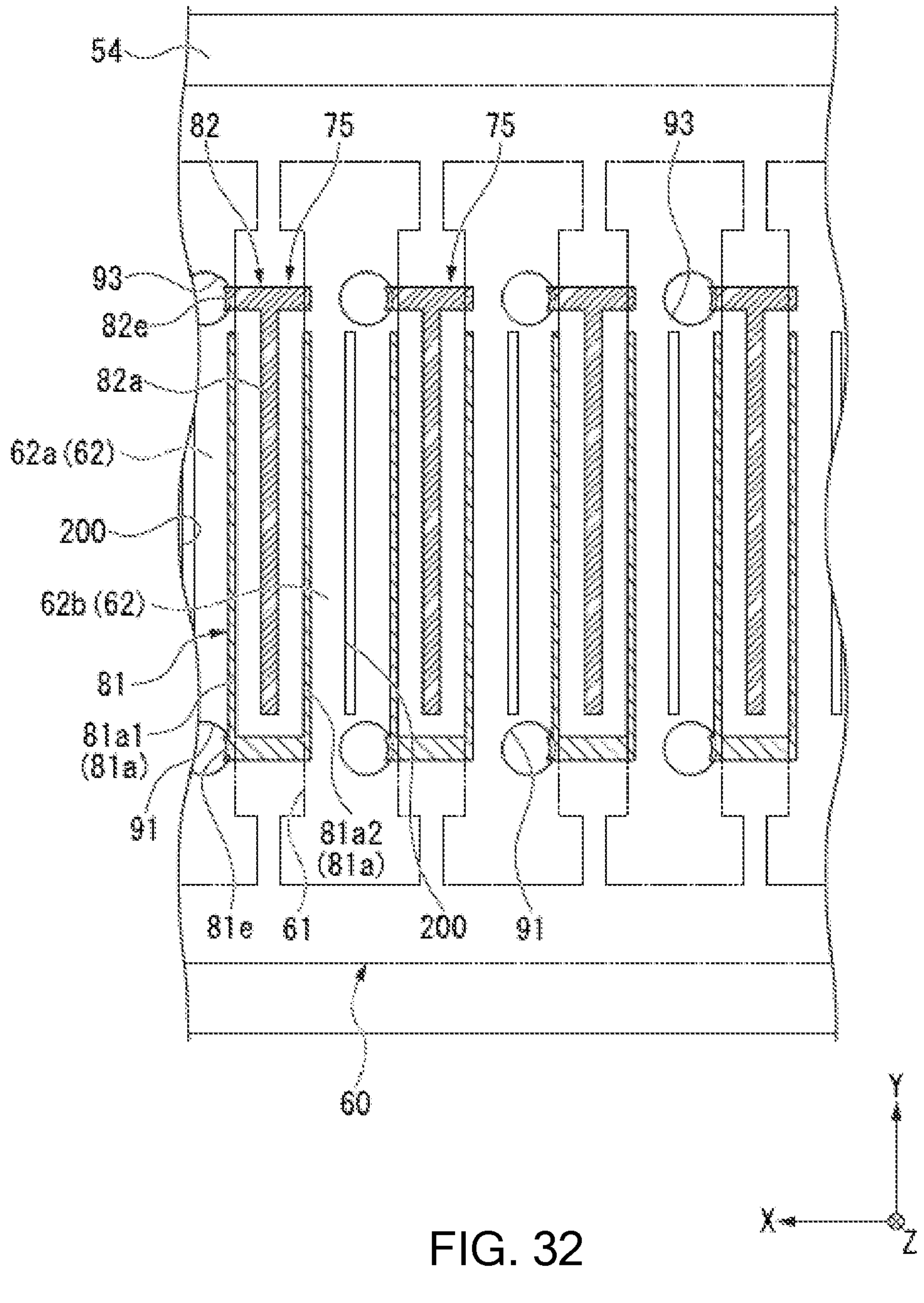
FIG. 32 is a bottom view of an actuator plate related to a fourth embodiment.
Figure 33:
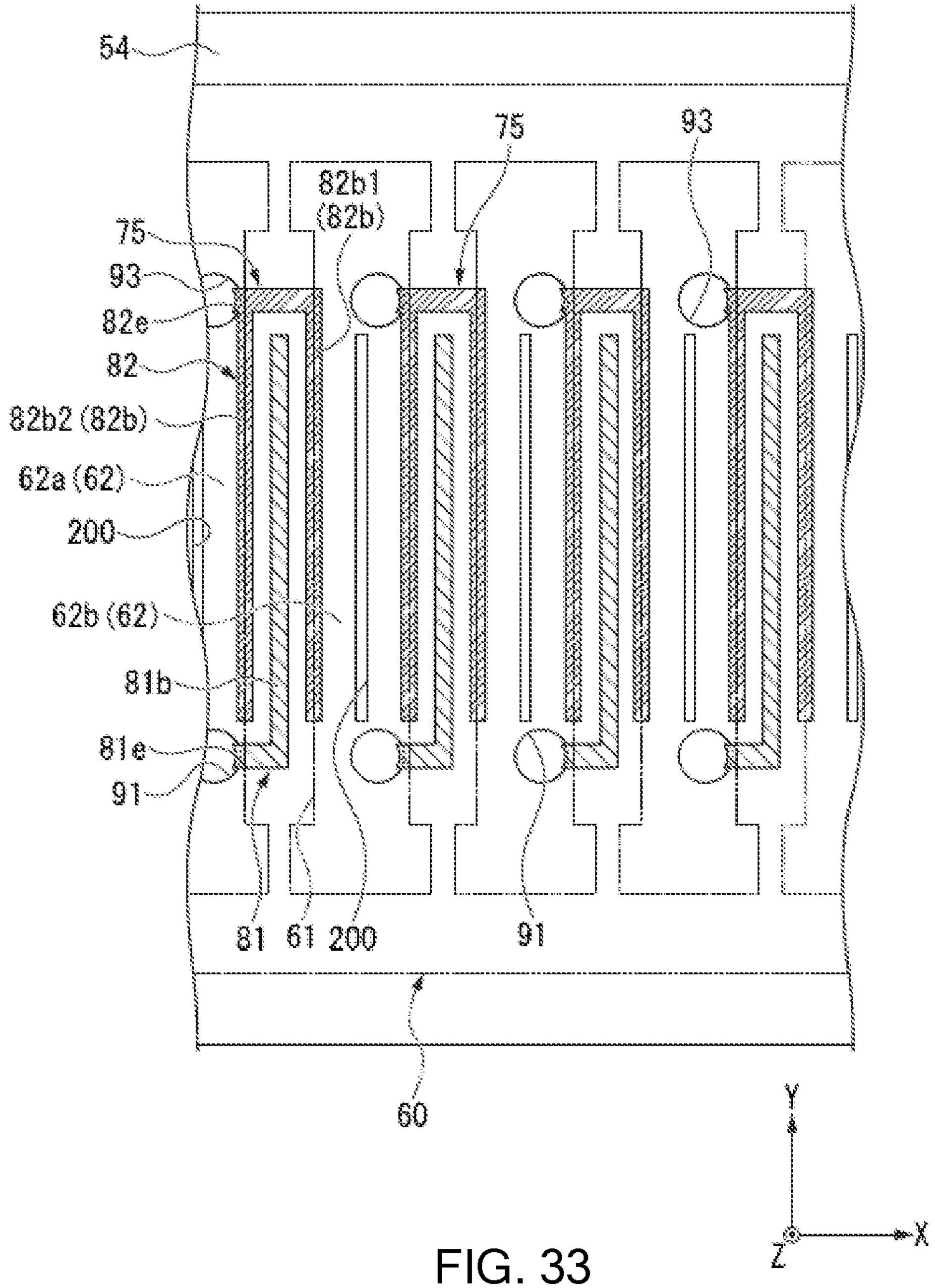
FIG. 33 is a plan view of the actuator plate related to the fourth embodiment.

FIG. 32 is a bottom view of the actuator plate 54. FIG. 33 is a plan view of the actuator plate 54.

In the head chip 50 shown in FIG. 32 and FIG. 33, the common interconnecting first holes 91 are each formed in a portion of the actuator plate 54, the portion being located at a position shifted in the X direction with respect to the pressure chamber 61, and being located at the −Y side with respect to the dividing groove 200. In the illustrative example, the common interconnecting first hole 91 is located between the pressure chambers 61 adjacent to each other. It should be noted that it is possible for the common interconnecting first hole 91 to be located at an outer side in the Y direction with respect to the pressure chamber 61.

The common interconnecting first hole 91 penetrates the actuator plate 54 in the Z direction. The common interconnecting first hole 91 is formed to have a circular shape when viewed from the Z direction. The width in the X direction in the common interconnecting first hole 91 is made wider than the width in the X direction in the dividing groove 200.

The first through interconnection 81*e* is formed on the inner surface of the common interconnecting first hole 91. The first through interconnection 81*e* is coupled to the lower-surface patterned interconnection 81*c* at the lower-end opening edge of the common interconnecting first hole 91 on the one hand, and is coupled to the upper-surface patterned interconnection 81*d* at the upper-end opening edge of the common interconnecting first hole 91 on the other hand. It should be noted that the common interconnecting first hole 91 can be formed so as to bridge the lower-surface patterned interconnection 81*c* and the upper-surface patterned interconnection 81*d* corresponding respectively to the pressure chambers 61 adjacent to each other. When setting the common electrodes 81*a*, 81*b* to the reference potential GND, the first through interconnections 81*e* corresponding to the pressure chambers 61 adjacent to each other can be commonalized on the inner surface of the common interconnecting first hole 91. Further, it is possible for the common interconnecting first hole 91 to be coupled to the dividing groove 200.

Similarly to the third embodiment shown in FIG. 31, the common interconnecting second hole 92 penetrates the second film 55 and the cover plate 56 in the Z direction at the position overlapping the common interconnecting first hole 91 when viewed from the Z direction. The common interconnecting second hole 92 is made one-size larger than the outer shape of the common interconnecting first hole 91 when viewed from the Z direction. The second through interconnection 81*f* is formed on the inner surface of the common interconnecting second hole 92. The second through interconnection 81*f* is coupled to the common pad 81*g* on the upper-end opening edge of the common interconnecting second hole 92.

As shown in FIG. 32 and FIG. 33, the individual interconnecting first holes 93 are each formed in a portion of the actuator plate 54, the portion being located at a position shifted in the X direction with respect to the pressure chamber 61, and being located at the +Y side with respect to the dividing groove 200. In the illustrative example, the individual interconnecting first hole 93 is located between the pressure chambers 61 adjacent to each other. The common interconnecting first hole 91 and the individual interconnecting first hole 93 are opposed in the Y direction to each other across the dividing groove 200. It should be noted that it is possible for the individual interconnecting first hole 93 to be located at an outer side in the Y direction with respect to the pressure chamber 61.

The individual interconnecting first hole 93 penetrates the actuator plate 54 in the Z direction. The individual interconnecting first hole 93 is formed to have a circular shape when viewed from the Z direction. The width in the X direction in the individual interconnecting first hole 93 is made wider than the width in the X direction in the dividing groove 200.

The first through interconnection 82*e* is formed on the inner surface of the individual interconnecting first hole 93. The first through interconnection 82*e* is coupled to the lower-surface patterned interconnection 82*c* at the lower-end opening edge of the individual interconnecting first hole 93 on the one hand, and is coupled to the upper-surface patterned interconnection 82*d* at the upper-end opening edge of the individual interconnecting first hole 93 on the other hand.

Similarly to the third embodiment shown in FIG. 31, the individual interconnecting second hole 94 penetrates the second film 55 and the cover plate 56 in the Z direction at the position overlapping the individual interconnecting first hole 93 when viewed from the Z direction. The individual interconnecting second hole 94 is made one-size larger than the outer shape of the individual interconnecting first hole 93 when viewed from the Z direction. The second through interconnection 82*f* is formed on the inner surface of the individual interconnecting second hole 94. The second through interconnection 82*f* is coupled to the individual pad 82*g* on the upper-end opening edge of the individual interconnecting second hole 94.

In the fourth embodiment, the interconnecting first holes 91, 93 are arranged at the positions shifted in the X direction with respect to the pressure chamber 61. Therefore, the reduction in size in the Y direction of the head chip 50 becomes possible compared to when the interconnecting first holes 91, 93 are arranged at the positions overlapping the pressure chamber 61 in the X direction.

Other Modified Examples

It should be noted that the scope of the present disclosure is not limited to the embodiments described above, but a variety of modifications can be applied within the scope or the spirit of the present disclosure.

For example, in the embodiments described above, the description is presented citing the inkjet printer 1 as an example of the liquid jet recording device, but the liquid jet recording device is not limited to the printer. For example, a facsimile machine, an on-demand printing machine, and so on can also be adopted.

In the embodiments described above, the description is presented citing the configuration (a so-called shuttle machine) in which the inkjet head moves with respect to the recording target medium when performing printing as an example, but this configuration is not a limitation. The configuration related to the present disclosure can be adopted as the configuration (a so-called stationary head machine) in which the recording target medium is moved with respect to the inkjet head in the state in which the inkjet head is fixed.

In the embodiments described above, there is described when the recording target medium P is paper, but this configuration is not a limitation. The recording target medium P is not limited to paper, but can also be a metal material or a resin material, and can also be food or the like.

In the embodiments described above, there is described the configuration in which the liquid jet head is installed in the liquid jet recording device, but this configuration is not a limitation. Specifically, the liquid to be jetted from the liquid jet head is not limited to what is landed on the recording target medium, but can also be, for example, a medical solution to be blended during a dispensing process, a food additive such as seasoning or a spice to be added to food, or fragrance to be sprayed in the air.

In the embodiments described above, there is described the configuration in which the Z direction coincides with the gravitational direction, but this configuration is not a limitation, and it is also possible to set the Z direction to a direction along the horizontal direction.

In the embodiments described above, the description is presented citing the head chip 50 of the recirculating side-shoot type as an example, but this configuration is not a limitation. The head chip can be of a so-called edge-shoot type for ejecting the ink from an end portion in the extending direction (the Y direction) in the pressure chamber 61.

In the embodiments described above, there is described when arranging that the potential difference occurs between the electrodes formed on one surface of the actuator plate 54 and the electrodes formed on the other surface, but this configuration is not a limitation. As shown in, for example, FIG. 34, it is possible to adopt a configuration in which the first common electrode 81*a* and the first individual electrodes 82*a* are formed on the lower surface (the first surface) of the actuator plate 54 on the one hand, and only the second individual electrode 82*b* is formed at a position opposed to the first common electrode 81*a* in the upper surface (the second surface) of the actuator plate 54 on the other hand. Further, as shown in FIG. 35, it is possible to adopt a configuration in which the second common electrodes 81*b* and the second individual electrode 82*b* are formed on the upper surface (the first surface) of the actuator plate 54 on the one hand, and only the first common electrode 81*a* is formed at a position opposed to the second individual electrode 82*b* in the lower surface (the second surface) of the actuator plate 54 on the other hand.

Figure 34:
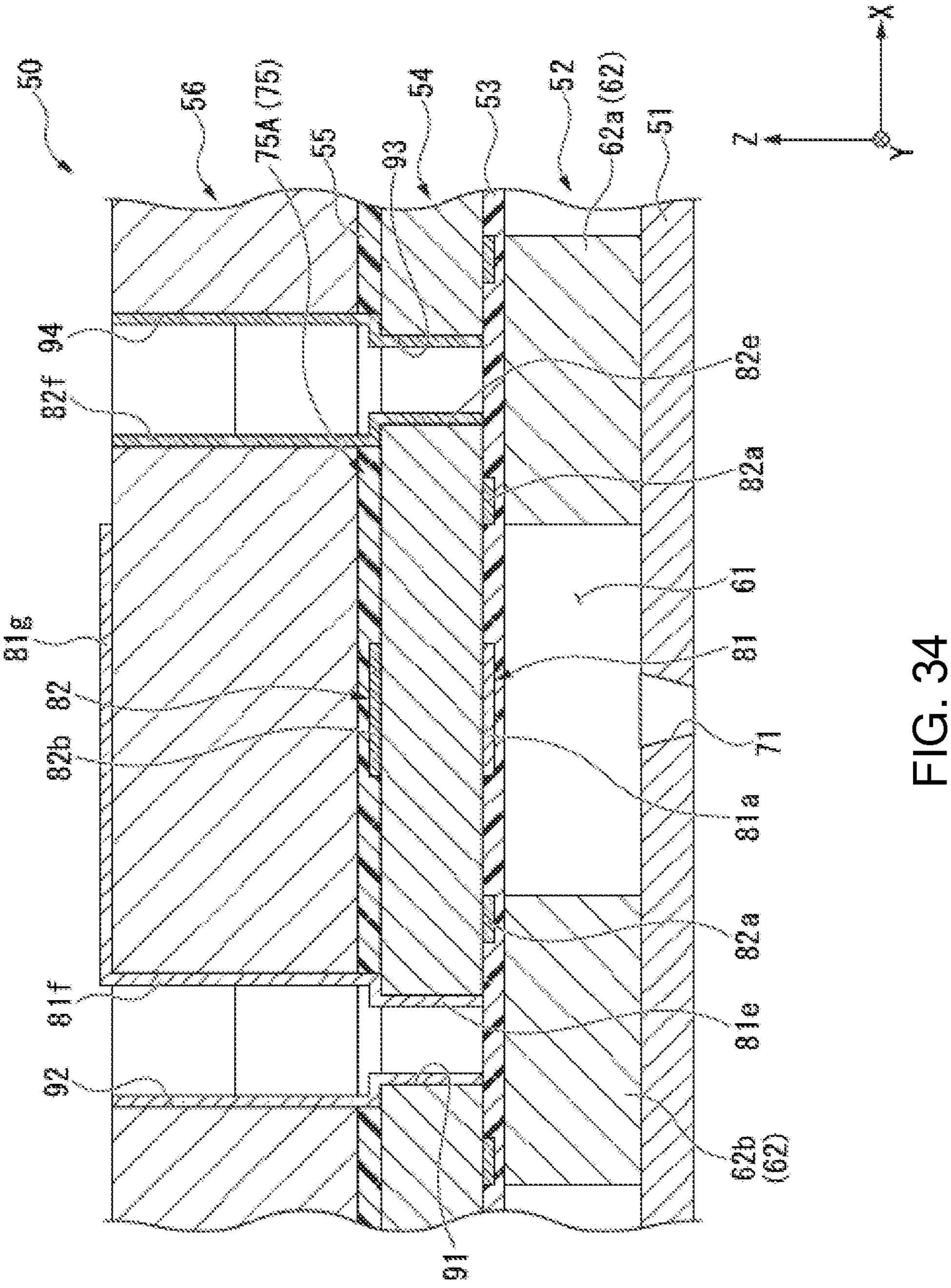
FIG. 34 is a cross-sectional view of a head chip according to a modified example.
Figure 35:
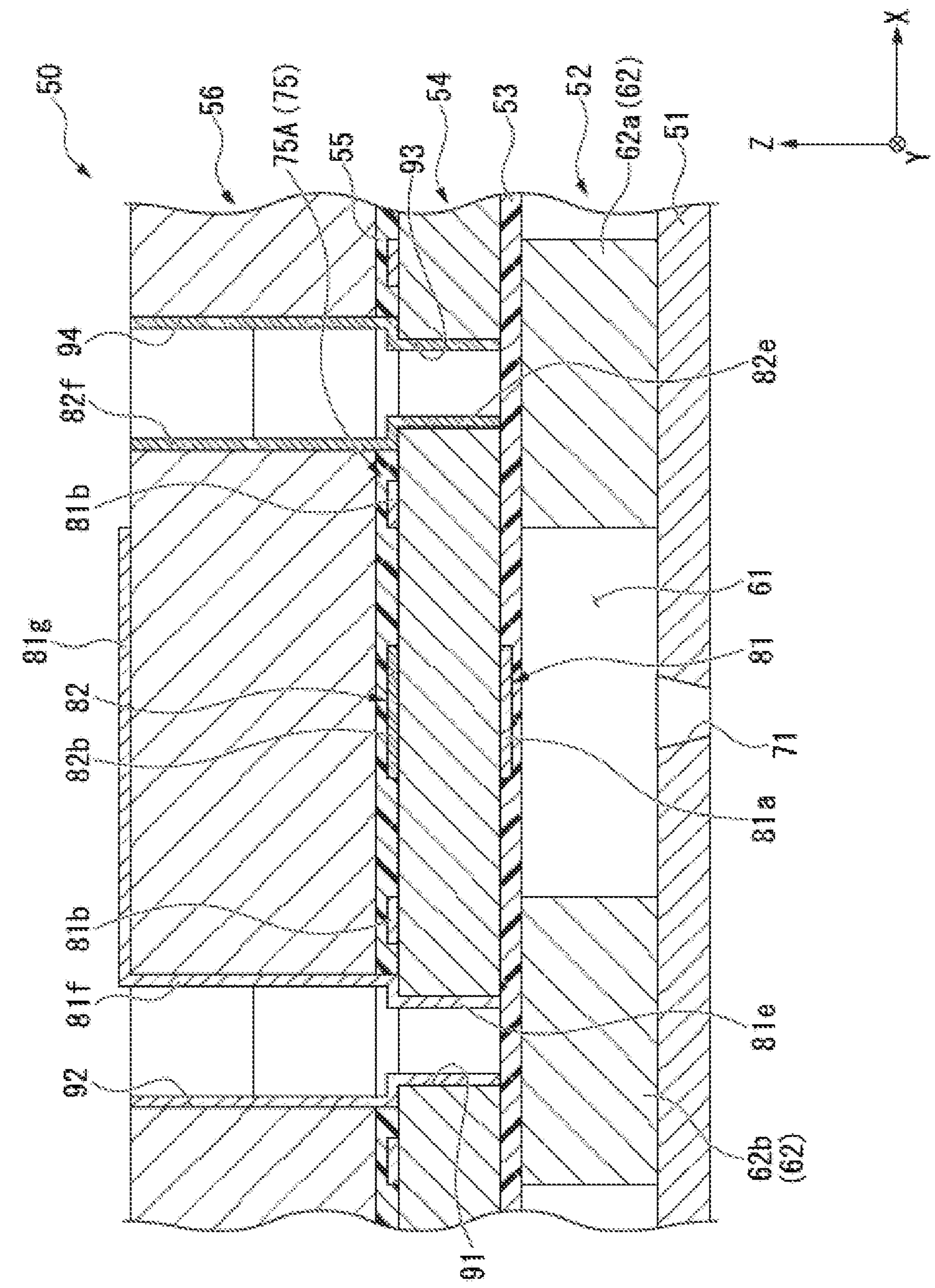
FIG. 35 is a cross-sectional view of a head chip according to a modified example.
Figure 36:
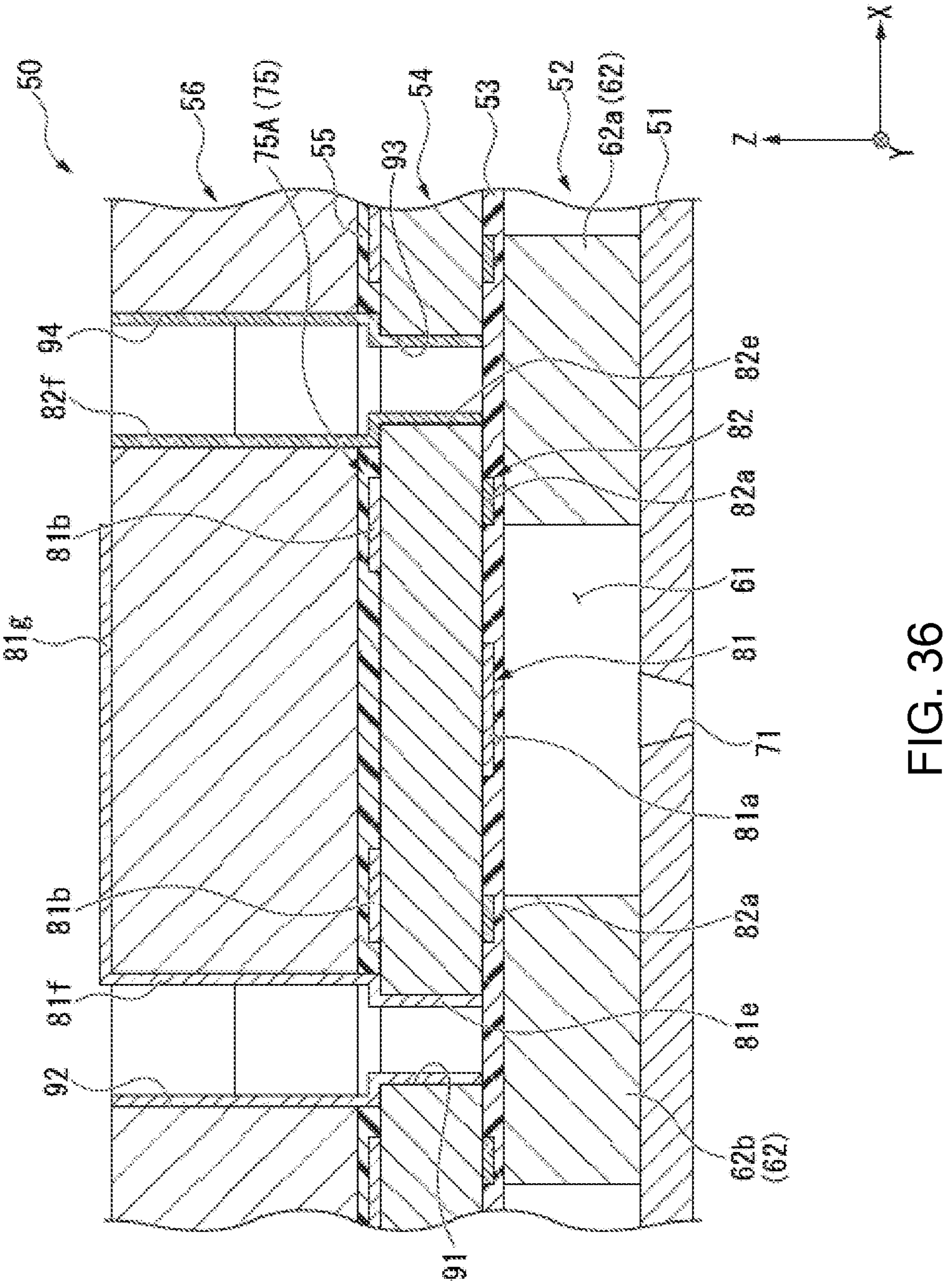
FIG. 36 is a cross-sectional view of a head chip according to a modified example.

Further, in the configuration shown in FIG. 34 described above, there is described the configuration in which the common electrode and the individual electrode are opposed to each other at the position overlapping at least the pressure chamber 61 when viewed from the Z direction, but this configuration is not a limitation. For example, as shown in FIG. 36, it is possible to adopt a configuration in which the first individual electrodes 82*a* and the second common electrodes 81*b* are opposed to each other at only the positions opposite to each other above the partition walls 62 in the state in which the first common electrode 81*a* and the first individual electrodes 82*a* are arranged side by side on the lower surface of the actuator plate 54.

In the embodiments described above, there is explained the configuration (so-called pulling-shoot) of deforming the actuator plate 54 in the direction of increasing the volume of the pressure chamber 61 due to the application of the drive voltage, and then restoring the actuator plate 54 to thereby eject the ink, but this configuration is not a limitation. It is possible for the head chip according to the present disclosure to be provided with a configuration (so-called pushing-shoot) in which the ink is ejected by deforming the actuator plate 54 in a direction of reducing the volume of the pressure chamber 61 due to the application of the voltage. When performing the pushing-shoot, the actuator plate 54 deforms so as to bulge toward the inside of the pressure chamber 61 due to the application of the drive voltage. Thus, the volume in the pressure chamber 61 decreases to increase the pressure in the pressure chamber 61, and thus, the ink located in the pressure chamber 61 is ejected outside through the nozzle hole 71. When setting the drive voltage to zero, the actuator plate 54 is restored. As a result, the volume in the pressure chamber 61 is restored. It should be noted that the head chip of the pushing-shoot type can be realized by inversely setting either one of the polarization direction and an electric field direction (the layout of the common electrodes and the individual electrodes) of the actuator plate 54 with respect to the head chip of the pulling-shoot type.

In the embodiments described above, there is described the configuration in which the electrodes on the both surfaces of the actuator plate 54 are coupled to each other through the through interconnections 81*e*, 82*e*, but this configuration is not a limitation. The coupling of the electrodes on the both surfaces of the actuator plate 54 can arbitrarily be changed. For example, it is possible for the electrodes on the both surfaces of the actuator plate 54 to be coupled to each other through a side surface of the actuator plate 54 or the like.

In the embodiment described above, there is described the configuration in which the actuator plate 54 is deformed due to both of the shear deformation mode and the bend deformation mode, but this configuration is not a limitation. It is sufficient for the actuator plate 54 to be deformable in at least either of the shear deformation mode and the bend deformation mode. When adopting the shear deformation mode alone, the common electrode and the individual electrode are arranged side by side on at least either of the surfaces facing to the Z direction in the actuator plate 54. Thus, it is possible to apply the potential difference in the X direction to the actuator plate 54. In contrast, when adopting the bend deformation mode alone, the common electrode and the individual electrode are arranged on the surfaces opposed in the Z direction to each other in the actuator plate 54. Thus, it is possible to apply the potential difference in the Z direction to the actuator plate 54.

In the embodiment described above, there is described when the films 53, 55 are adopted as the buffers, but this configuration is not a limitation. It is sufficient for the buffer to be a material lower in compressive elasticity modulus than the actuator plate 54 and the cover plate 56, and therefore, the buffer can be, for example, an adhesive.

Besides the above, it is arbitrarily possible to replace the constituents in the embodiments described above with known constituents within the scope or the spirit of the present disclosure, and it is also possible to arbitrarily combine the modified examples described above with each other.

What is claimed is:

1. A head chip comprising:

a flow channel member having a plurality of pressure chambers containing liquid;

an actuator plate which is stacked on the flow channel member in a state of being opposed in a first direction to the pressure chambers;

a drive electrode which is formed on a surface of the actuator plate, the surface facing to the first direction, and which is configured to deform the actuator plate in the first direction so as to change a volume of at least one of the pressure chambers; and a dividing groove which is configured to zone the actuator plate between the pressure chambers adjacent to each other is formed in a portion of the actuator plate, the portion being located between the pressure chambers adjacent to each other when viewed from the first direction, wherein the pressure chambers include opening parts which open toward the actuator plate in the first direction, the drive electrode is disposed on a first surface of the actuator plate, the first surface being opposed to the flow channel member in the first direction, the dividing groove opens on at least the first surface, an insulating sheet is attached on the first surface so as to cover the drive electrode and the dividing groove, and the actuator plate is disposed on the flow channel member via the insulating sheet so as to close the opening parts, and further wherein the actuator plate is provided with a through hole penetrating the actuator plate in the first direction, and a through interconnection which is configured to pattern the drive electrode toward a second surface of the actuator plate is formed in the through hole, the second surface facing to an opposite side to the first surface in the first direction.

2. The head chip according to claim 1, wherein the through hole is formed integrally with the dividing groove in the portion of the actuator plate, the portion being located between the pressure chambers adjacent to each other when viewed from the first direction.

3. The head chip according to claim 1, wherein the through hole is disposed separately from the dividing groove.

4. The head chip according to claim 3, wherein defining an arrangement direction of the plurality of pressure chambers when viewed from the first direction as a second direction, the through hole is disposed in the actuator plate at an outer side of the pressure chambers in a third direction crossing the second direction when viewed from the first direction.

5. The head chip according to claim 4, wherein the through hole extends in the second direction so as to straddle the plurality of pressure chambers.

6. The head chip according to claim 4, wherein the through hole is disposed for each of the pressure chambers in a portion located at the outer side of the pressure chambers in the third direction.

7. A liquid jet head comprising the head chip according to claim 1.

8. A liquid jet recording device comprising the liquid jet head according to claim 7.

* * * * *